(12) United States Patent
Lefevre et al.

(10) Patent No.: US 8,923,885 B2
(45) Date of Patent: Dec. 30, 2014

(54) METHOD AND DEVICES FOR INTERFACING A PLURALITY OF MOBILE ELEMENTS WITH A COMPUTER SYSTEM IN REAL TIME

(75) Inventors: Valentin Lefevre, Puteaux (FR); Christophe Duteil, Paris (FR)

(73) Assignee: Epawn, Paris (FR)

( * ) Notice: Subject to any disclaimer, the term of this patent is extended or adjusted under 35 U.S.C. 154(b) by 117 days.

(21) Appl. No.: 13/820,224

(22) PCT Filed: Sep. 2, 2011

(86) PCT No.: PCT/FR2011/052012
§ 371 (c)(1),
(2), (4) Date: Mar. 1, 2013

(87) PCT Pub. No.: WO2012/028827
PCT Pub. Date: Mar. 8, 2012

(65) Prior Publication Data
US 2013/0157690 A1  Jun. 20, 2013

(30) Foreign Application Priority Data
Sep. 3, 2010  (FR) ...................................... 10 57014

(51) Int. Cl.
| | |
|---|---|
| *H04W 24/00* | (2009.01) |
| *G01S 3/80* | (2006.01) |
| *A63F 3/00* | (2006.01) |
| *G06F 3/046* | (2006.01) |
| *H04W 4/02* | (2009.01) |
| *H04B 5/00* | (2006.01) |

(52) U.S. Cl.
CPC ........... *H04W 4/025* (2013.01); *A63F 3/00643* (2013.01); *G06F 3/046* (2013.01); *H04B 5/00* (2013.01); *H04B 5/0075* (2013.01); *H04B 5/0043* (2013.01); *A63F 2003/00665* (2013.01)
USPC ....................................... 455/456.1; 367/127

(58) Field of Classification Search
CPC .................................. H04W 4/02; G06F 3/04
USPC ......... 455/456.2, 456.3, 456.1, 427; 342/450, 342/457; 463/11, 39; 367/127
See application file for complete search history.

(56) References Cited

U.S. PATENT DOCUMENTS

2002/0122003 A1* 9/2002 Patwari et al. ................ 342/450
2004/0169594 A1 9/2004 Ely et al.
(Continued)

FOREIGN PATENT DOCUMENTS

FR    2 860 985    4/2005
GB    2 314 415    12/1997

OTHER PUBLICATIONS

International Search Report dated Nov. 10, 2011, corresponding to PCT/FR2011/052012.
(Continued)

*Primary Examiner* — Kiet Doan
(74) *Attorney, Agent, or Firm* — Young & Thompson

(57) ABSTRACT

The subject of the invention is in particular the real-time interfacing of a plurality of mobile elements with a computing system. After having selected at least one location module integrated into a mobile element, the at least one location module is activated sequentially. At least one signal is then received from the at least one activated location module and at least one item of information relating to the position of the mobile element including the at least one activated location module is calculated in real time on the basis of the at least one signal received. A single location module may be activated at a given instant.

18 Claims, 9 Drawing Sheets

(56) References Cited

U.S. PATENT DOCUMENTS

2007/0015588 A1   1/2007   Matsumoto et al.
2008/0084789 A1*  4/2008   Altman .................. 367/127
2008/0238885 A1   10/2008  Zachut et al.
2008/0261693 A1   10/2008  Zalewski

OTHER PUBLICATIONS

L. Giarre, et al.; Medium Access in WiFi Networks: Strategies of Selfish Nodes; IEEE Signal Processing Magazine, IEEE Service Center; vol. 26, No. 5; Sep. 1, 2009; pp. 124-128.

* cited by examiner

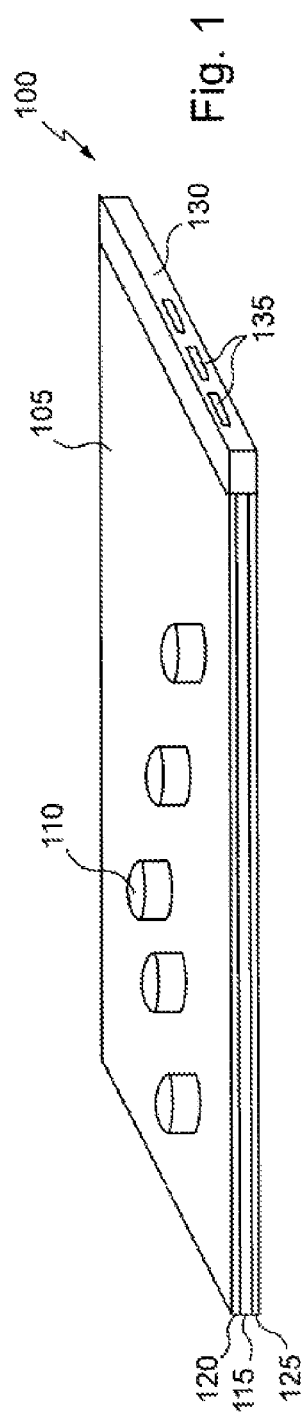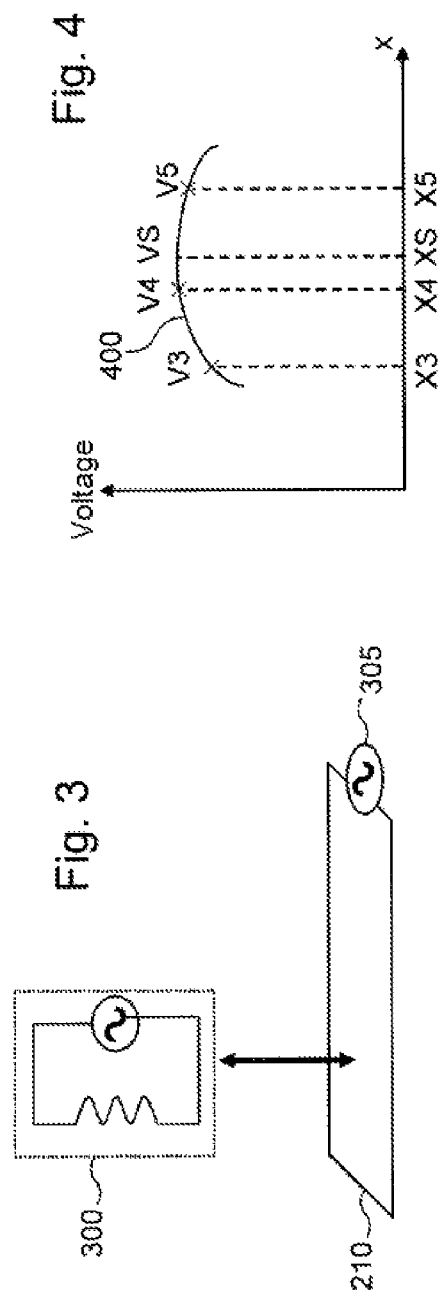

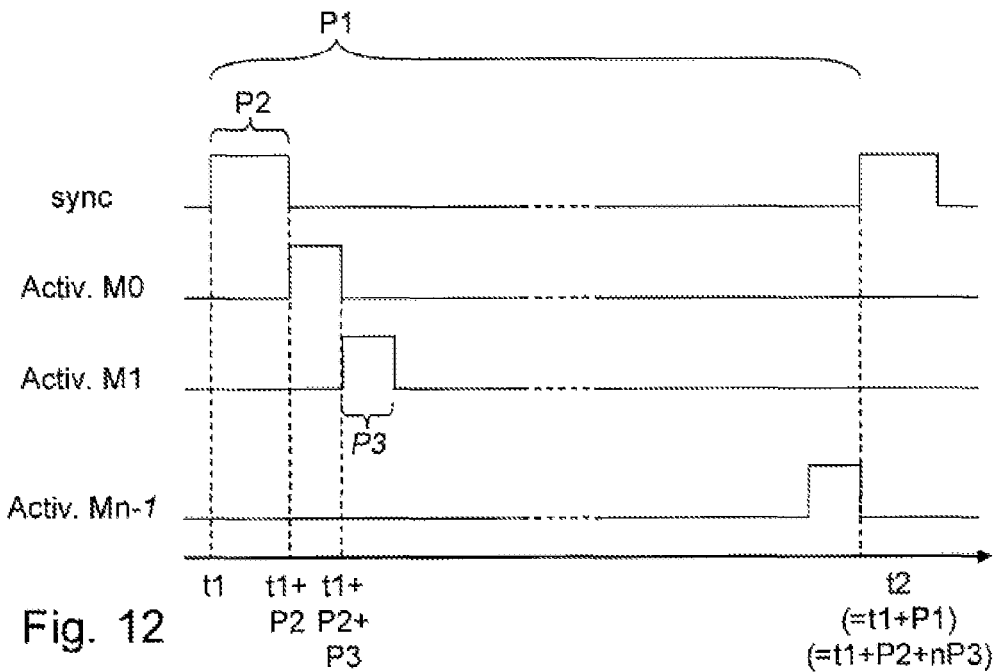
Fig. 12
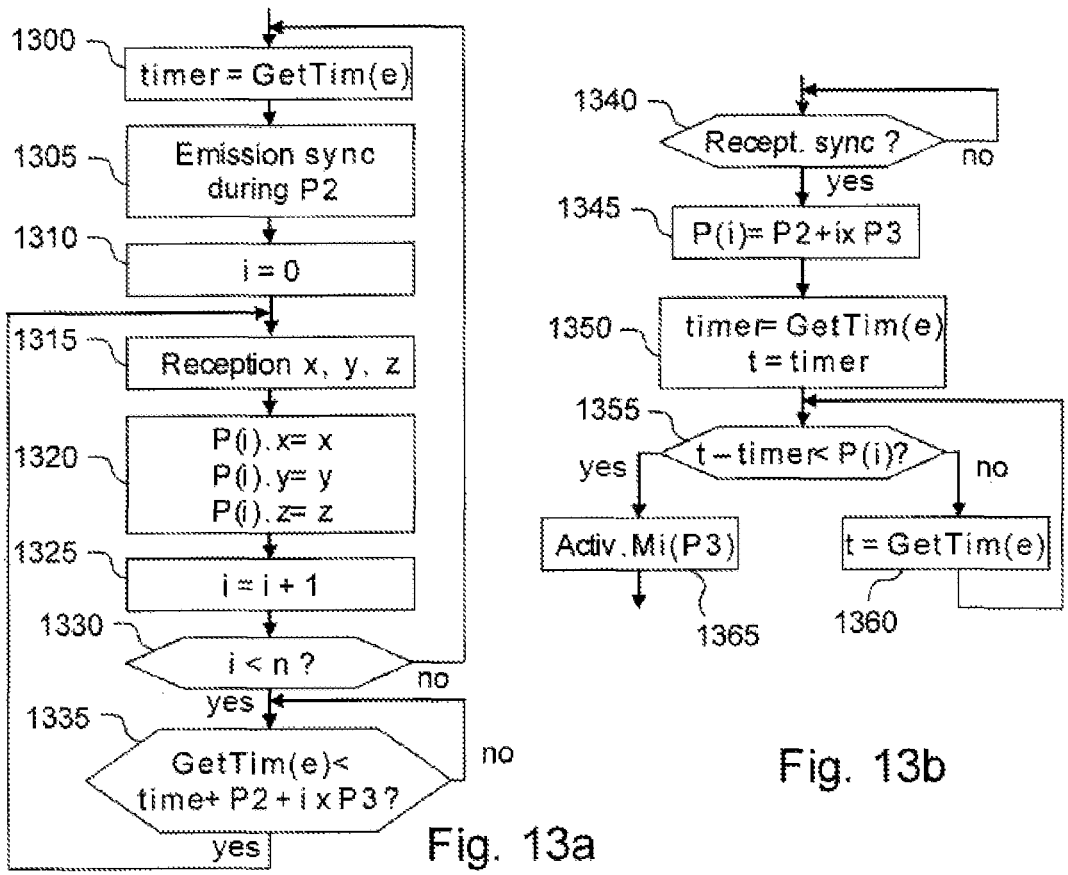
Fig. 13a
Fig. 13b

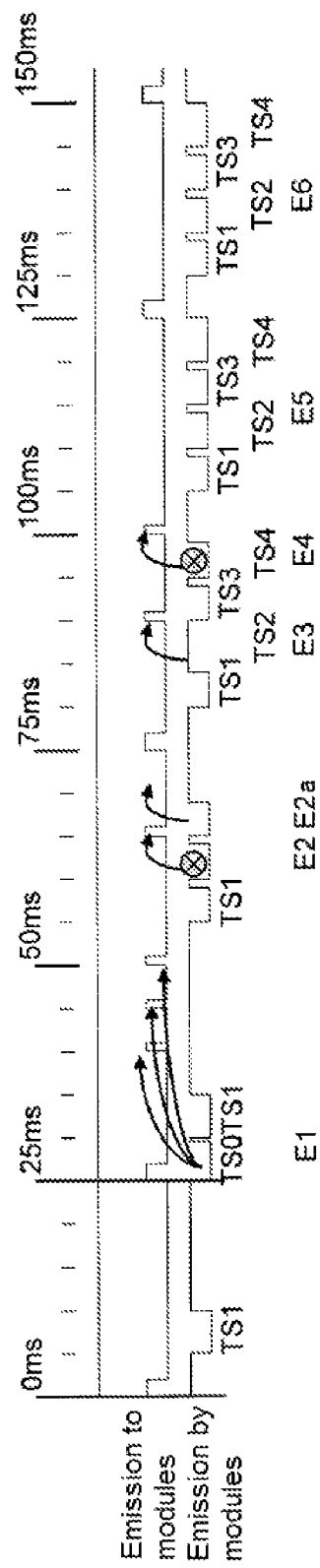

METHOD AND DEVICES FOR INTERFACING A PLURALITY OF MOBILE ELEMENTS WITH A COMPUTER SYSTEM IN REAL TIME

The present invention relates to interfaces between a user and a computer system, in particular in the field of games, and more particularly to a method and devices for interfacing a plurality of mobile elements with a computer system.

In many situations, it may be necessary for a computer system to detect the position and/or orientation of mobile elements to allow the latter to react accordingly. Thus, for example, in a chess game allowing a user to play against a virtual player simulated by the computer system, the application implemented on the computer system must know the position of all the pieces on the chess board, in particular those moved by the user, in order to calculate its move.

There are solutions for detecting the position and/or orientation of real objects on a game board, making it possible to use these objects as an interface for a computer system.

Thus, for example, touch screens of the resistive type can be used as a game board in order to detect the position of an object such as a pen when sufficient pressure is applied. However, this type of screen generally only supports a single contact and requires constant pressure by the user to determine the position. In other words, it is not possible to detect the position of the pen if the pressure exerted by the latter is removed.

It is also possible to use touch screens of the capacitive type, based on the principle of current leakage through a conductive body. However, only conductive objects connected to earth allow for the detection of their position. Thus, for example, the positions of plastic or wooden objects cannot be determined using such screens.

Moreover, in general, solutions based on touch screens or touch film only support a limited number of simultaneous or quasi-simultaneous contacts and do not allow for the determination of a large number of objects.

Other solutions implement technologies based on infrared, in particular in the form of tables. Thus, for example, products known under the names Surface (Surface is a trademark of Microsoft), mTouch (mTouch is a trademark of Merel Technologies) and Entertaible (Entertaible is a trademark of Philips) use infrared cameras arranged within the thickness of the table. However, the required thickness of these tables makes them bulky and less mobile and gives them a certain rigidity. In addition, their price does not really allow for family use.

Finally, these solutions do not allow for the detection of the altitude, in relation to a predetermined reference, of mobile elements the movements and/or orientations of which are detected.

The invention makes it possible to solve at least one of the problems described above.

The object of the invention is thus a method for interfacing in real time a plurality of mobile elements with a computer system, the method comprising the following steps:
- transmission of an activation signal to at least one localisation module incorporated in at least one mobile element of said plurality of mobile elements;
- sequential activation of said at least one localisation module, said activation comprising a switching step to excite an element radiating from said at least one localisation module;
- reception of at least one signal from said at least one activated localisation module;
- calculation, on the basis of said at least one received signal, of at least one item of information on the position of said mobile element comprising said at least one activated localisation module,
- a single localisation module being able to be activated at a given instant.

The process according to the invention thus enables a computer system to determine simply, efficiently, and in real time the position of a large number of mobile elements which can be used to interact with the computer system.

According to a particular embodiment, said activation signal comprises an item of data making it possible to identify a localisation module in order to selectively activate a single localisation module. The activation sequence is thus determined by the computer system and the logic unit of the localisation modules is simple in that it essentially consists of comparing a received identifier with a predetermined identifier.

According to another particular embodiment, said activation signal is a common activation signal for common control of the activation of a plurality of localisation modules. According to this embodiment, the activation sequence is determined by the logic unit of the localisation modules in combination with the computer system or not. According to this embodiment, the computer system does not need prior knowledge of the localisation modules.

Still according to a particular embodiment, the method further comprises a step to calculate a time delay value for each localisation module of said plurality of localisation modules, said time delay value representing a time interval between the reception of an activation signal and the activation of the module localisation. The activation sequence of the localisation modules is thus defined by time delay values associated therewith.

Each time delay value is, for example, determined according to an item of identification data of the localisation module.

The time delay values can be dynamically determined thereby making it possible to interface new mobile elements and/or remove mobile elements from the interface without the need to reconfigure it. Such dynamic determination can in particular be based on the use of a time-division multiple access algorithm.

Said common activation signal can be induced by a signal used independently of said process. This can involve, for example, a signal induced by a synchronization frame of a screen being used. It is therefore not necessary in this case to generate a specific signal.

According to a particular embodiment, the method further comprises a step to calculate at least one item of information on the orientation of said mobile element, said mobile element comprising at least two localisation modules.

Still according to a particular embodiment, the method further comprises a step to transmit at least one item of data from said at least one localisation module to said computer system. Said at least one item of data can in particular be representative of an identifier of said at least one localisation module. In this case, it allow, the computer system to associate a position with a localisation module. It can also be representative of a state of the localisation module or a function associated therewith.

Still according to a particular embodiment, the method further comprises a step to check the validity of said at least one localisation module, said step of sequential activation of said at least one localisation module being performed in response to said validity check step. Thus, only the positions and/or orientations of the mobile elements playing an active role in interfacing with the computer system are determined.

The method preferably further comprises a step of assigning a state of validity or invalidity to said at least one localisation module, said state of validity or invalidity being determined according to said at least one item of position information.

Still according to a particular embodiment, said step to receive at least one signal comprises a step to sequentially select a plurality of receivers, said at least one signal being received by at least one receiver selected from said plurality of receivers. It is thus possible to determine the position of a localisation module according to the characteristics of the signals received and the receivers selected.

A further object of the invention is a mobile element for a device to interface a plurality of mobile elements with a computer system, said mobile element comprising at least one localisation module, said localisation module comprising the following means:

means for emitting a signal making it possible to calculate the position of said localisation module;

means for generating an excitation signal of said means for emitting a signal;

switching means for controlling the transmission of said excitation signal to said means for emitting a signal, and, means for receiving an activation signal and, according to at least one item of information of said activation signal, activating said switching means to enable the emission of a signal which can be used to calculate the position of said localisation module.

The mobile element according to the invention thus enables a computer system to determine simply, efficiently and in real time the position of a large number of mobile elements which can be used to interact with the computer system.

According to a particular embodiment, said means for receiving an activation signal comprise means for calculating a time delay value, said time delay value representing a time interval between the reception of an activation signal and the activation of said switching means.

The activation sequence of the localisation modules is thus defined by the time delay values associated therewith.

Still according to a particular embodiment, said at least one localisation module comprises at least one solenoid, excitable by induction, for supplying electric power to components of said at least one localisation module.

A further object of the invention is a device to interface a plurality of mobile elements with a computer system, the device comprising means suitable for implementing each of the steps of the method described above. The advantages of such a device are similar to those mentioned above.

Other advantages, purposes and features of the present invention will become apparent from the following detailed description, given by way of a non-limitative example, in the light of the attached drawings in which:

FIG. 1 shows diagrammatically an example of an architecture implementing the invention;

FIG. 3 shows diagrammatically the physical principle of inductive coupling between a solenoid and a conductive loop of a detection surface;

FIG. 4 shows diagrammatically an interpolation mechanism making it possible to calculate the position of a solenoid placed on a detection surface, along a given axis, on the basis of measurements obtained by a system such as that described with reference to FIG. 2

Figure 9A:
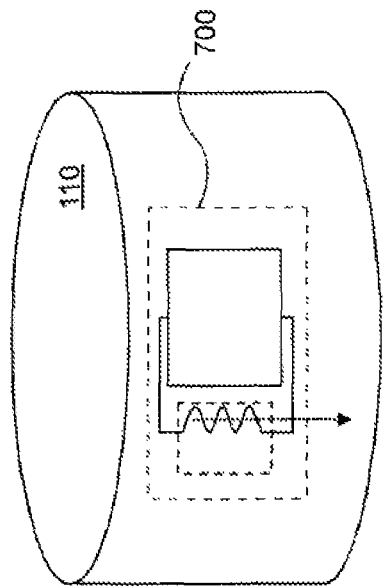
Figure 9B:
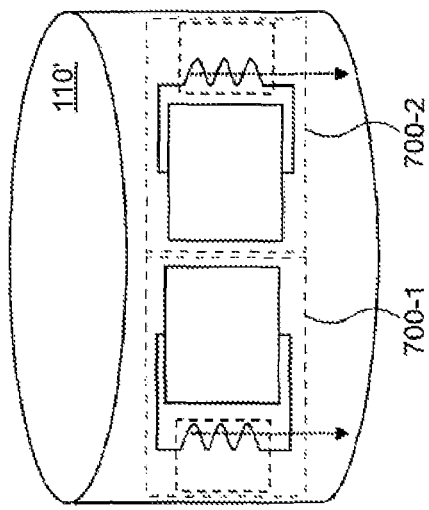
Figure 11:
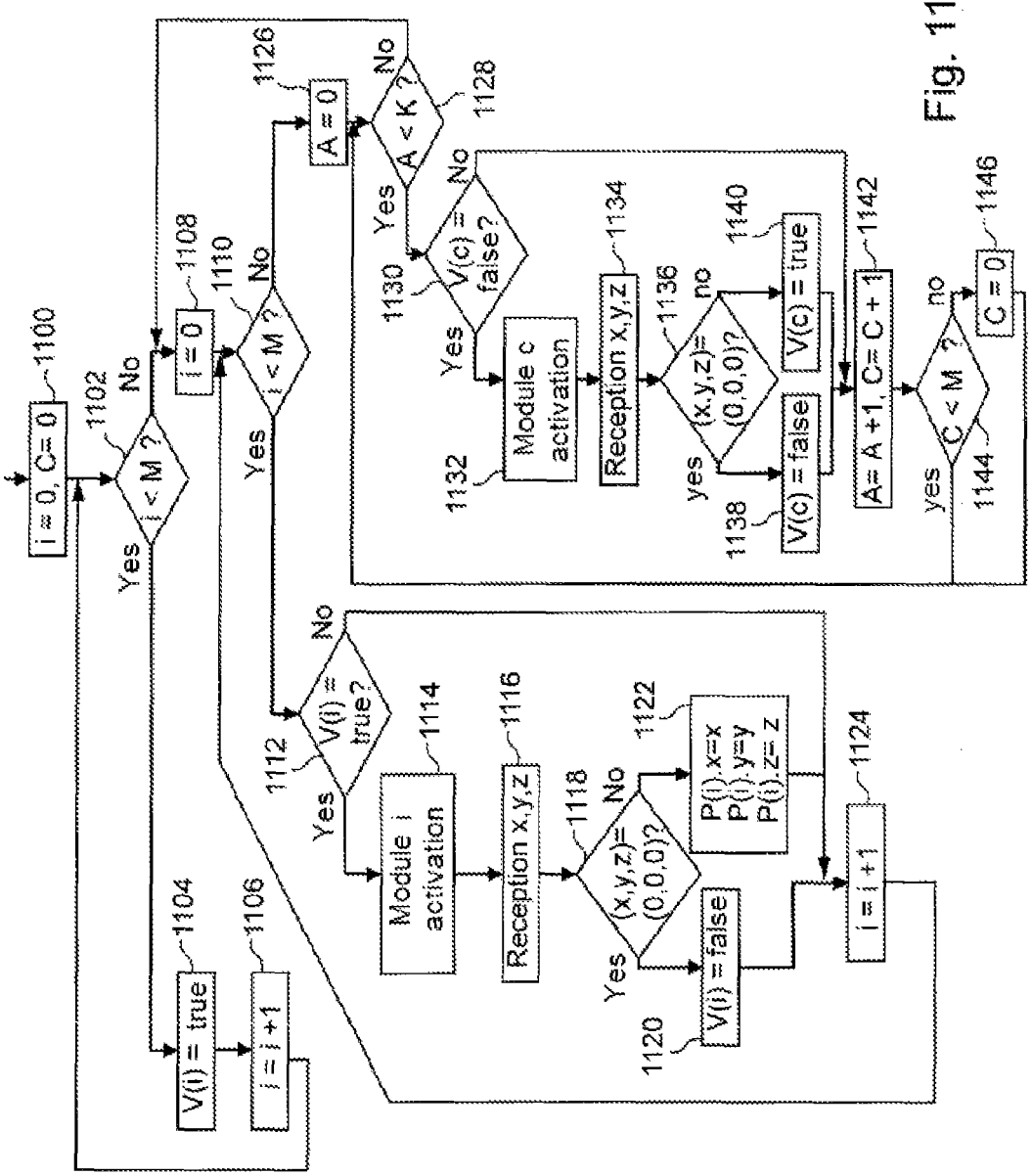
Figure 10:
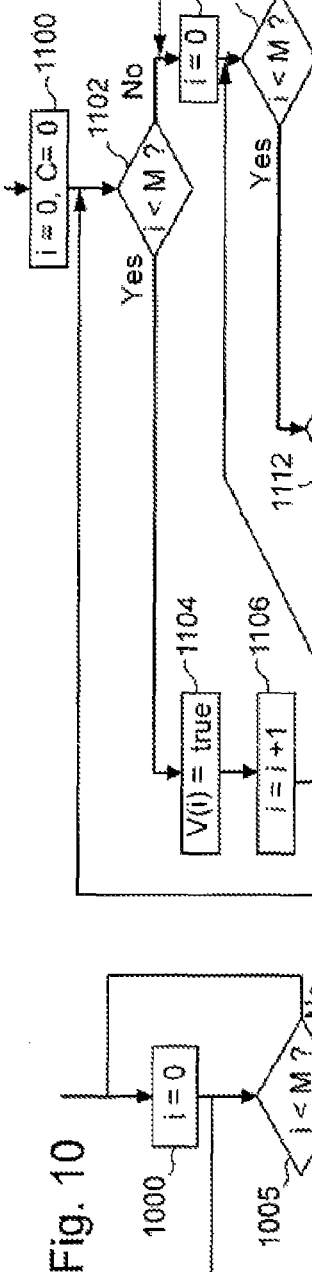

FIG. 9, comprising FIGS. 9a and 9b, shows diagrammatically two examples of mobile elements the position of which can be determined and the position and orientation of which can be determined, respectively;

FIGS. 10 and 11 show examples of algorithms which can be used to sequentially activate a set of localisation modules and calculate the positions and/or orientations of the corresponding mobile elements;

FIG. 12 shows an example of a timing chart for the activation of localisation modules as a function of a common activation signal;

FIG. 13, comprising FIGS. 13a and 13b shows a third example of an algorithm which can be used to sequentially activate a set of localisation modules by means of a common activation signal, and, FIG. 14 shows a timing chart for a system for the dynamic activation of localisation modules.

The invention relates generally to determining the position (abscissa, ordinate and/or altitude) and/or orientation (heading, pitch and/or roll) of mobile elements or pieces arranged on a surface and used together. For these purposes, the invention implements a surface for the detection of mobile elements, mobile elements each provided with at least one localisation module and an activation module making it possible to determine the position and, preferably, the orientation, of each mobile element, sequentially. The position can be a two-dimensional position, in one plane, or a three-dimensional position comprising an altitude (or elevation). The invention thus relates to a novel interface between a user and a computer system associated with the position and orientation of several mobile elements. The detection surface can be combined with a screen to provide, for example, elements of decor or information.

By way of illustration, three-dimensional positions of mobile elements can be captured by an electromagnetic field. For this purpose, a surface for the detection of the positions of mobile elements, consisting of an electromagnetic capture mesh of the line/column type is used. It is combined with an electronic module capable of calculating, by demultiplexing, the position of a localisation module emitting an electromagnetic field.

Each localisation module is therefore selected sequentially, for example according to an identifier specific thereto, so that it emits an electromagnetic field. For this purpose, each localisation module comprises an activation mechanism such that, when activated, it emits an electromagnetic field which can be captured by the detection surface.

A position detection control module is associated with the detection surface in order to sequentially activate electromagnetic emissions of the localisation modules via a control signal or to control such sequential activation. The control signal between this module and the localisation modules can be transmitted via a wired connection or preferably via wireless connections, for example an HF (High Frequency) radio signal or a signal complying with Wi-Fi, ZigBee, or Bluetooth standards (Wi-Fi, Bluetooth and ZigBee are trademarks).

The surface for the detection of the positions is, for example, a PCB (Printed Circuit Board) type card for electromagnetic reception, flexible or rigid. It can be combined with a screen, also flexible or rigid, tactile or not, for example an LCD (Liquid Crystal Display) or OLED (Organic Light-Emitting Diode) type screen, making it possible to move the mobile elements on an interactive visual surface. The detection surface can also be combined with a magnetized surface, making it possible to move the mobile elements on an inclined plane, vertical or inverted (upside down) or subjected to shocks, without altering the position detection.

FIG. 1 shows diagrammatically an example of an architecture 100 implementing the invention.

The architecture 100 here comprises a board 105, for example a game board, on which mobile elements 110 are arranged, enabling a user to interact with a computer system combined with the board by moving the mobile elements 110. Although only five mobile elements are shown here, it is possible to use several tens or even several hundreds. The board 105 defines the position and/or orientation detection zone of the mobile elements used.

The board 105 here comprises a detection surface 115 coupled to a screen 120 and a magnetized surface 125 (the detection surface 115, the screen 120, and the magnetized surface 125 are here substantially parallel). It also comprises a hardware module 130 (or central processing system) to detect the position and, if necessary, the orientation of the mobile elements 110 as well as to implement one or more applications with which the user interacts. The hardware module 130 is in particular responsible for managing the detections of the positions and/or orientations of the mobile elements, i.e. identifying the localisation modules one after another, activating them so that they emit, each in turn, an electromagnetic field, and evaluating their positions.

The hardware module 130 is preferably inserted into a casing with the other elements of the board 105. Alternatively, it can be a remote module incorporated, for example, in a computer or a game console. It can be electrically powered by rechargeable battery or via a mains adapter and presents a set of standard connections 135, for example an electrical socket for a mains adapter, USB, Ethernet, VGA (Video Graphics Array) and/or HDMI (High Definition Multimedia) ports, as appropriate, in particular if a screen is combined with the detection zone. It also comprises, preferably, a wireless communication module, for example a WiFi or Bluetooth type wireless communication module making it possible to interact with another computer system and/or to access data via a communication network.

The hardware module 130 typically comprises a calculation module and a control module for position detection and capture, as detailed below. The calculation module is fitted here with a central processing unit (CPU), a graphics processing unit (GPU), memory components (Random Access Memory (RAM), Read Only Memory (ROM), and/or Flash type memory) to store the programs and variables needed for the implementation of the invention as well as an audio processing module in the form, for example, of a chipset.

The control module for position detection and capture sequentially activates, preferably by radio, each localisation module the position of which is to be determined or controls such a sequential activation. After activation, each localisation module here emits an electromagnetic field captured by the detection surface. The latter then transmits to the module for position detection and capture, information making it possible to calculate the position of a localisation module, for example of the (x, y, z) type. As described below, when several localisation modules are combined within a single mobile element, it is possible, on the basis of the positions of these localisation modules, to determine orientation parameters of the mobile element, for example in the form of angles. The positions and/or orientation of all the mobile elements the position and/or orientation of which are to be determined are then transmitted to the calculation module, which uses them to manage the interactivity with the application in question.

Figure 2:
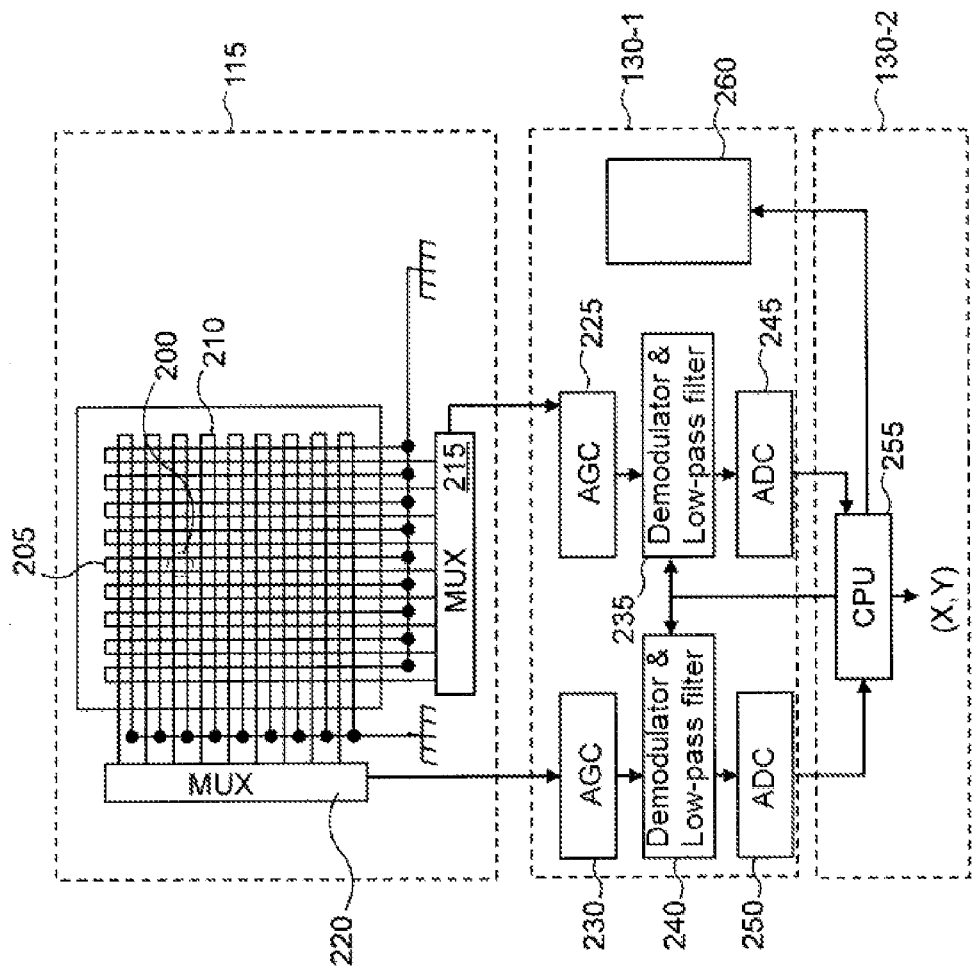
FIG. 2 shows an example of a detection surface and associated logic unit in accordance with the invention, according to a first embodiment.

FIG. 2 shows an example of a detection surface and associated logic unit according to a first embodiment.

The detection surface 115 is here made up of a mesh in the form of lines and columns forming a conductive grid. The latter comprises a set of conductive loops along two orthogonal axes. Each loop is a discrete sensor making it possible to measure the intensity of the current or voltage induced by a radiating element, typically a solenoid belonging to a mobile element the position and/or orientation of which are to be calculated, which is positioned on the detection surface.

By way of illustration, it is assumed here that a solenoid is placed at position 200, i.e. at the intersection of loops 205 and 210 of which one end is connected to earth and the other end is connected to the electronic components used to calculate a position. When the solenoid located at position 200 is supplied with power, it generates an inductive current in loops 205 and 210 which can be analysed and compared with the current induced in the other loops. It is thus possible, by inductive coupling between the solenoid and the grid and by measuring the induced current, to determine the position of the solenoid.

Multiplexers 215 and 220 are connected to each loop of each of the two axes of the grid, i.e. in this case to each of the vertical and horizontal loops, respectively. The outputs from multiplexers 215 and 220 are connected to automatic gain controllers (AGC) 225 and 230, respectively, of the control module for position detection and capture, referenced here as 130-1, of the hardware module 130. The output signals from the automatic gain controllers 225 and 230 are first of all demodulated in the demodulators 235 and 240, respectively. Demodulation produces a direct current (DC) signal proportional to the original sine wave supplemented by multiple alternating current (AC) components of the fixed frequency emitted by the solenoid.

According to a commonly-used configuration, the calculation module, referenced here as 130-2, of the hardware module 130 controls the multiplexers 215 and 220 in order to sequentially activate the loops, i.e. to activate a loop n+1 after a loop n. When the last loop is reached, the processor initiates a new cycle and controls the activation of the first loop.

A low-pass filter is advantageously used in each demodulator 235 and 240 to suppress the unwanted harmonics of the demodulated signal as well as the electromagnetic background noise. This filtering makes it possible to refine the measurements of the signals originating from the automatic gain controllers 225 and 230, after demodulation, which are then digitized in analog/digital converters (ADC) 245 and 250, respectively.

The digital values obtained are transmitted to the central processing unit (CPU) 255 of the calculation module 130-2 to be stored. As shown, the central processing unit 255 controls the demodulators 235 and 240.

After the values have been stored, the central processing unit increments the address of the multiplexers in order to proceed to digitisation of the signals originating from the following loops. When a last loop is reached, the central processing unit reinitializes the address of the multiplexer corresponding to the value of the first loop of the axis in question.

At the end of a cycle, the central processing unit has stored, for each axis, as many digital values as there are adjacent loops near the position of the solenoid. On the basis of these values, the central processing unit calculates the position of the solenoid by interpolation as described below.

It is noted here that the loops can be earthed by metal strips positioned between the different loops in order to protect them against electromagnetic interference. An alternative consists of placing a uniform earth plane under the conductive grid.

In addition, the control module for position detection and capture 130-1 here comprises a radio emitter 260, controlled by the central processing unit 255 of the calculation module 130-2, making it possible to activate a localisation module of a mobile element. By way of illustration, the central processing unit 255 transmits to the radio emitter 260 an identifier of a localisation module to be activated. This identifier is encoded and then transmitted in the form of a digital or analog radio signal. Each localisation module receiving this signal can then compare the identifier received with its own identifier and activate itself if the identifiers are identical.

Thus, in order to estimate the position of a set of localisation modules, it is necessary to perform a cycle on each localisation module and, for each of these cycles, according to the embodiment described here, a cycle on each set of loops.

Several detection surfaces can be combined with each other, the resulting surface area of the detection surface being the sum of the surface areas of the detection surfaces combined. For these purposes, one detection surface is considered to be the master, the others being considered slaves. The sequential activation of the mobile elements is managed by the master detection surface, which receives, preferably, the positions calculated by the hardware modules associated with each slave detection surface and consolidates them by producing a table containing the coordinates and angles of freedom of the localisation modules.

FIG. 3 shows diagrammatically the physical principle of inductive coupling between a solenoid and a conductive loop of a detection surface.

According to the invention, each mobile element the position and/or orientation of which are to be calculated comprises at least one solenoid the axis of which is preferably directed towards the detection surface.

An alternating current passes through the solenoid 300 and it emits an electromagnetic field which is propagated towards the detection surface, in particular, in this example, towards the loop 210. The loop 210, receiving an electromagnetic field originating from the solenoid 300, is coupled with the solenoid 300. It is then possible to measure an alternating current signal at the terminals of this loop, referenced 305.

The coupling between the solenoid 300 and the loop 210 can be expressed in the form of the following equation, $$R = \frac{k}{D^2} E$$

wherein

E denotes the voltage at the terminals of the solenoid 300, R denotes the voltage of the signal received at the terminals 305 of the receiving loop 210, D is the distance between the solenoid 300 and the receiving loop 210 and k is a constant associated with factors intrinsic to the system comprising the solenoid and the receiving loop, in particular the number of turns of the solenoid and the size of the loop.

FIG. 4 shows diagrammatically an interpolation mechanism making it possible to calculate the position of a solenoid placed on a detection surface, along a given axis, on the basis of the measurements obtained by a system such as that described with reference to FIG. 2.

It is assumed here that the solenoid is located close to vertical loops B3, B4 and B5, positioned at abscissa X3, X4 and X5, the voltages measured at the terminals of these loops being denoted V3, V4 and V5, respectively. The solenoid is located here in a position, on the x-axis, denoted XS.

Coordinates X3, X4 and X5 can be obtained by the central processing unit on the basis of an identifier of the corresponding loop (these values are predefined according to the routing configuration of the detection surface and, preferably, stored in a non-volatile memory).

The portion of curve 400 shown in FIG. 4 shows the variation in voltage for the solenoid position XS according to the positions of the loops coupled with the solenoid, extrapolated from the values measured by the loops B3, B4 and B5. It can be likened to a second degree function of the parabolic type. This local approximation corresponds, in practice, to the phenomenon of electromagnetic coupling between a solenoid and loops of a conductive grid.

The following relationships illustrate this property.

$$V3 = a(X3 - XS)^2 + b$$

$$V4 = a(X4 - XS)^2 + b$$

$$V5 = a(X5 - XS)^2 + b$$

where a and b are constants, a being a constant less than zero (a<0).

Moreover, given the assumption of a second degree function, the relationships between the abscissa X3, X4 and X5 can be expressed in the following form:

$$X4 - X3 = X5 - X4 = \Delta X$$

$$X5 - X3 = 2\Delta X$$

X representing the distance between the abscissa X3 and X4 and between the abscissa X4 and X5).

Thus, it is possible to interpolate the position of the solenoid according to the following formula:

$$XS = X3 + \frac{\Delta X}{2} \frac{3V3 - 4V4 + V5}{V3 - 2V4 + V5}$$

It is also possible, according to the same logic, to determine the position of the solenoid along the y-axis.

In addition, the distance between the solenoid and the loop (i.e. the altitude of the solenoid relative to the detection surface) can be defined by the following relationship:

$$D = \sqrt{\frac{k}{R} E}$$

The distance D is therefore a function of the value R representing the voltage at the terminals of the relative loops of the detection surface. It can be extrapolated from the measurements made. It is noted that the accuracy of the distance calculation is in particular linked to the stability of the signal E emitted by the solenoid, the value of which should be as constant as possible over time, which requires a stabilized power supply in the localisation module, which should not drop as the battery discharges. This can be ensured by a voltage regulator in the localisation module.

Figure 5:
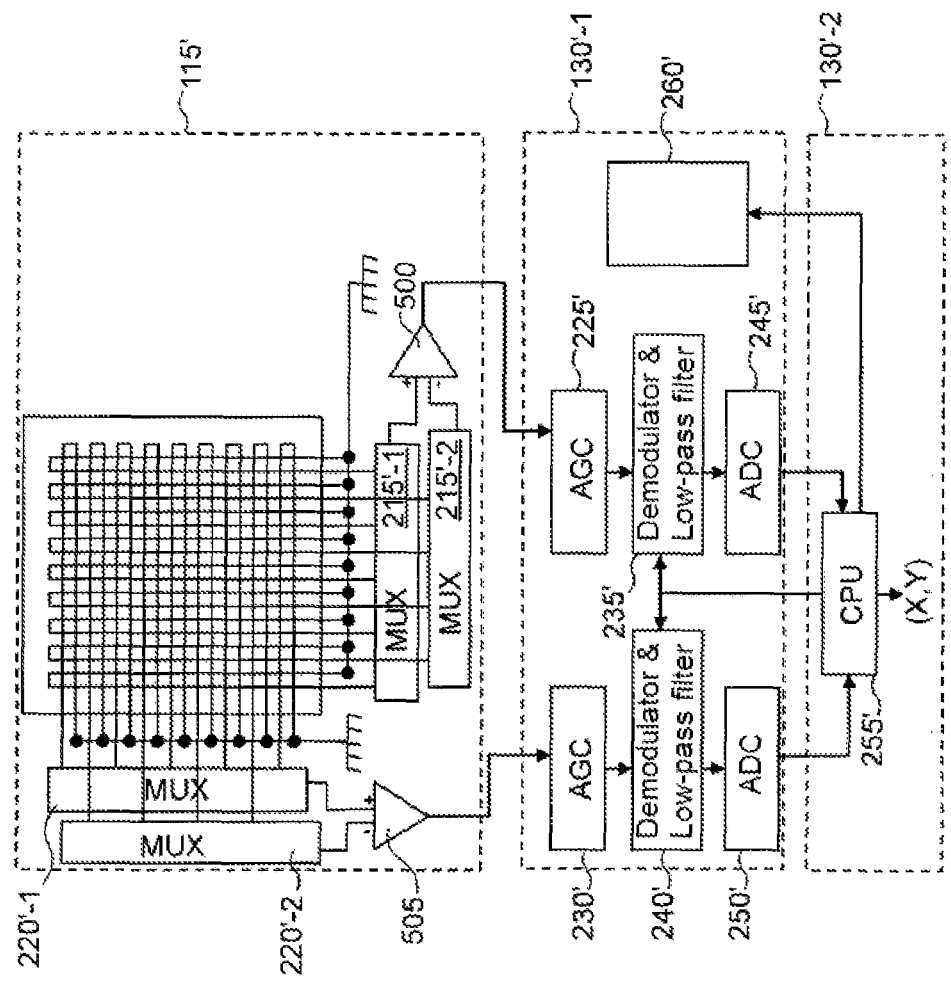
FIGS. 5 and 6 show an example of a detection surface and associated logic unit in accordance with the invention, according to second and third embodiments, respectively.

FIG. 5 shows an example of a detection surface and associated logic unit according to a second embodiment.

An essential difference between the detection surface and associated logic unit shown in FIGS. 2 and 5 lies in the use of additional multiplexers and differential amplifiers.

Like the detection surface 115 described above, the detection surface 115' here is made up of a mesh in the form of lines and columns constituting a conductive grid comprising a set of loops along two orthogonal axes. Similarly, each loop is a discrete sensor making it possible to measure the intensity of the current or voltage induced by a solenoid (belonging to a mobile element the position and/or orientation of which are to be detected), which is positioned on the detection surface.

Two multiplexers are linked here with each set (vertical and horizontal) of loops. Thus, for each of the two dimensions of the grid, a first multiplexer is alternately connected one loop out of every two while a second multiplexer is connected to the remaining loops. Multiplexer 215'-1 is connected here to the odd vertical loops while multiplexer 215'-2 is connected to the even vertical loops. Similarly, multiplexer 220'-1 is connected here to the odd horizontal loops while multiplexer 220'-2 is connected to the even horizontal loops.

The outputs from multiplexers 215'-1 and 215'-2 connected to the vertical loops are connected to a differential amplifier 500 while the outputs of multiplexers 220'-1 and 220'-2 connected to the horizontal loops are connected to a differential amplifier 505.

The multiplexers and differential amplifiers therefore produce, for each axis of the detection surface grid, an immediate comparison between the signals received by two adjacent loops. In other words, the output signal from each differential amplifier is a differential signal.

Processing similar to that described with reference to FIG. 2 is then applied to the differential signals. However, the filtering here is adaptive filtering (and not low-pass filtering) in order to suppress the common noise and the noise associated with demodulation and, thus, increase the signal-to-noise ratio. This embodiment allows for greater amplification and, consequently, better accuracy in the calculation of positions. The central unit of the calculation module controls the adaptive filter so that it is preferably reset to zero after the end of each cycle of measurements.

The output from each differential amplifier 500 and 505 is connected to an automatic gain controller (AGC) 225' and 230' respectively of the control module for position detection and capture, referenced here 130'-1. The output signals from the automatic gain controllers 225 and 230 are first of all demodulated in demodulators 235' and 240' respectively in order to obtain a direct current signal proportional to the original sine wave supplemented by multiple alternating current components of the fixed frequency emitted by the solenoid.

Again, the calculation module, referenced here 130'-2, controls multiplexers 215'-1, 215'-2, 220'-1 and 220'-2 in order to sequentially activate the loops, i.e. to activate a loop n+1 after a loop n. When the last loop is reached, the processor initiates a new cycle and controls the activation of the first loop.

As indicated previously, an adaptive filter is advantageously used in each demodulator 235' and 240' in order to suppress undesirable harmonics of the demodulated signal and the background electromagnetic noise. This filtering makes it possible to refine the measurements of signals originating from the automatic gain controllers 225' and 230', after demodulation, which are then digitized in the analog/digital converters 245' and 250', respectively.

The digital values obtained are transmitted to the central processing unit 255' of the calculation module 130'-2 to be stored. As shown, the central processing unit 255' controls the demodulators 235' and 240'.

Again, after the values have been stored, the central processing unit increments the address of the multiplexers in order to proceed to digitisation of the signals originating from the following loops. When a last loop is reached, the central processing unit reinitializes the address of the multiplexer corresponding to the value of the first loop of the axis in question.

At the end of a cycle, the central processing unit has stored, for each axis, as many digital values as there are adjacent loops near the position of the solenoid. On the basis of these values, the central processing unit calculates the position of the solenoid by interpolation as described above.

The loops can also be earthed here by metal strips positioned between the various loops in order to protect them from electromagnetic interference, an alternative consisting of placing a uniform earth plane under the conductive grid.

Like the control module for position detection and capture 130-1 described with reference to FIG. 2, the control module for position detection and capture 130'-1 here comprises a radio emitter 260', controlled by the central processing unit 255' of the calculation module 130'-2, making it possible to activate a localisation module.

Figure 6:
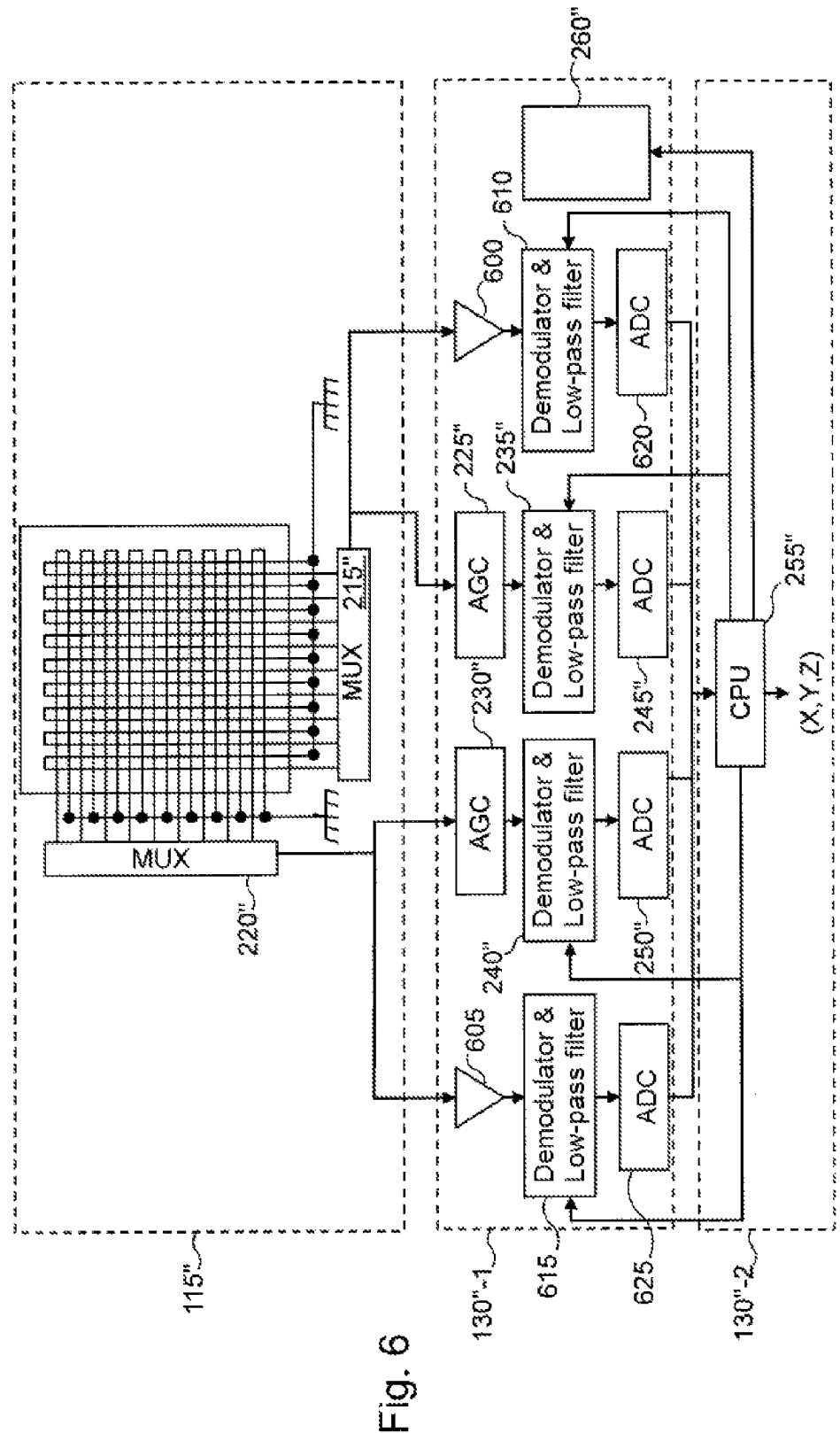

FIG. 6 shows an example of a detection surface and associated logic unit according to a third embodiment.

This embodiment is based on that described with reference to FIG. 2. It also comprises two fixed-gain amplifiers, two demodulation chains with low-pass filtering and analog/digital conversion per axis of the conductive grid. This embodiment allows for a precise calculation of the altitude of the mobile elements located above the detection board.

It is noted here that the altitude calculation requires the use of absolute position data (and not relative as is possible for positions along the x-axes and y-axes).

For this purpose, a second position capture chain is implemented where the automatic gain controller is replaced by a constant gain amplifier. The loss of accuracy resulting from the omission of the automatic gain controller is replaced by the ability of the constant gain amplifier to provide absolute measurements.

The detection surface 115" is again made up of a mesh in the form of lines and columns constituting a conductive grid comprising a set of loops along two orthogonal axes, each loop forming a discrete sensor making it possible to measure the intensity of the current or voltage induced by a solenoid (belonging to a mobile element the position and/or orientation of which are to be detected), which is positioned on the detection surface.

Multiplexers 215" and 220" are connected to each loop of each of the two axes of the grid, i.e. here to each of the vertical and horizontal loops, respectively. The outputs of multiplexers 215 and 220 are connected to the automatic gain controllers (AGC) 225" and 230" as well as to the fixed-gain amplifiers 600 and 605, respectively, of the control module for position detection and capture, referenced here 130"-1.

The output signals of the automatic gain controllers 225" and 230" are first of all demodulated in the demodulators 235" and 240", respectively. The demodulation produces a direct current signal proportional to the original sine wave supplemented by multiple alternating current components of the fixed frequency emitted by the solenoid.

Similarly, the output signals of fixed-gain amplifiers 600 and 605 are first demodulated in demodulators 610 and 615, respectively.

Again, the calculation module, here referenced 130"-2 controls multiplexers 215" and 220" in order to sequentially activate the loops, i.e. to activate a loop n+1 after a loop n. When the final loop is reached, the processor initiates a new cycle and controls the activation of the first loop.

A low-pass filter is advantageously implemented in each demodulator 235", 240", 610 and 615 in order to suppress the unwanted harmonics of the demodulated signal as well as the background electromagnetic noise. This filtering makes it possible in particular to refine the measurements of the signals originating from the automatic gain controllers 225" and 230", after demodulation.

The output signals of the demodulators 235", 240", 610 and 615 are then digitized in the analog/digital converters (ADC) 245", 250", 620 and 625, respectively.

The digital values obtained are transmitted to the central processing unit 255" of the calculation module 130-2" to be stored. As shown, the central processing unit 255" controls the demodulators 235", 240", 610 and 615.

After the values have been stored, the CPU increments the address of the multiplexers in order to proceed to digitisation of the signals originating from the following loops. When a last loop is reached, the central processing unit reinitializes the address of the multiplexer corresponding to the value of the first loop of the axis in question.

At the end of a cycle, the central processing unit has stored, for each axis, as many numerical values as there are adjacent loops near the position of the solenoid. On the basis of these values, the central processing unit calculates the position of the solenoid by interpolation as described above.

It is noted here that the loops can be earthed by metal strips positioned between the different loops in order to protect them against electromagnetic interference. An alternative consists of placing a uniform earth plane under the conductive grid.

In addition, the control module for position detection and capture 130"-1 here comprises a radio transmitter 260", controlled by the central processing unit 255" of the calculation module 130"-2, making it possible to activate a localisation module.

The mobile elements the position and/or orientation of which are to be determined contain at least one localisation module incorporating an activation receiver, preferably wireless, for example an HF, Wi-Fi, ZigBee or Bluetooth radio communication module, making it possible to receive a command to activate their electromagnetic emissions. Each localisation module is capable of determining whether the activation command received, emitted by a control module for position detection and capture, is addressed to it or not. An item of identification information on the localisation module to be activated can be transmitted in analog or digital form.

Figure 7:
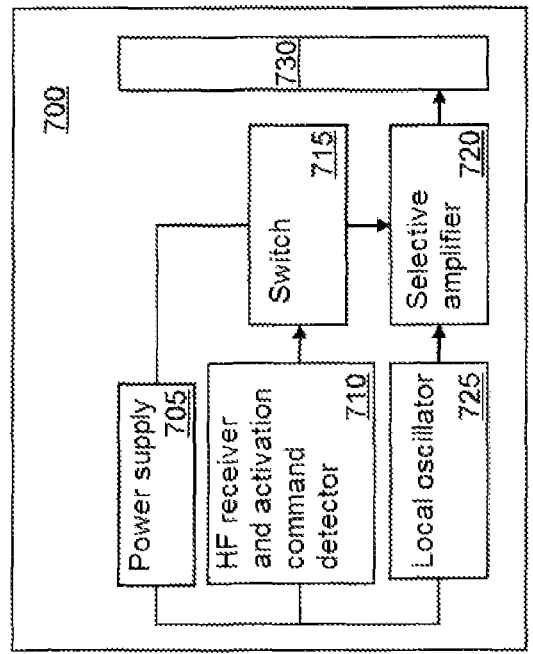
FIG. 7 shows diagrammatically logic blocks of a localisation module of a mobile element the position and/or orientation of which can be determined on the basis of a system such as those shown in FIGS. 2, 5 and 6.

FIG. 7 shows diagrammatically the logic blocks of a localisation module for a mobile element the position and/or orientation of which can be determined on the basis of a system such as that described above.

Such a mobile element is, preferably, independent as regards both its electric power supply and the reception of electromagnetic emission command signals.

The localisation module 700 thus comprises an electric power supply module 705 supplying a voltage for all the components of the localisation module as well as a command reception and detection module 710, which receives and demodulates a signal, for example an HF signal, emitted by an external control module for position detection and capture, in order to determine whether the signal received is intended to activate the localisation module. As described above, such detection can be performed by comparing an identifier received with a previously stored identifier.

The localisation module 700 also comprises a switch 715, controlled by the command reception and detection module 710, as well as a selective amplifier 720 controlled by the switch 715. Finally, the localisation module 700 comprises a local oscillator 725 generating a frequency, preferably fixed, stable, and of the square type and a solenoid 730.

The selective amplifier 720 generates, depending on the position of the switch 715 and on the basis of the signal originating from the local oscillator 725, a sine wave voltage at the terminals of the solenoid 730, allowing the solenoid 730 to generate sufficient radiation power almost instantaneously (i.e. in real time). The almost instantaneous oscillation turn-on and cut-off time of the selective amplifier are obtained by the pairing formed by the local oscillator 725 and the selective amplifier 720.

For this purpose, the local oscillator 725 and the selective amplifier 720 are, according to a first embodiment, always active when the localisation module is powered (they are not stopped as a function of the activation of the localisation module). The switch 715 is then used to route the signal from the local oscillator 725 to the input to the selective amplifier 720 or not. Thus, when the local oscillator 725 is switched to the selective amplifier 720, the selective amplifier 720 reaches its specific oscillation frequency in a very short time, typically a few microseconds (a standard oscillator of the RLC type in question requires a turn-on time of a few milliseconds, incompatible with real time). Cut-off of the selective amplifier 720, consisting in disconnecting the local oscillator 725 from the selective amplifier 720 is, for the same reasons, almost instantaneous (of the order of a microsecond).

According to another embodiment, the local oscillator 725 is always active when the localisation module is powered (it is not stopped as a function of the activation of the localisation module), while the selective amplifier 720 is only powered when the localisation module is activated. The purpose of the switch 715 is then to control the electric power supply for the selective amplifier 720. The selective amplifier turn-on and cut-off time are similar to those of the first embodiment.

Several types of electric power supply can be used for the localisation module. The power supply can be obtained from a rechargeable battery and a standard control circuit. It can also be obtained from a battery and a voltage regulator making it possible to obtain a constant voltage throughout a range of use of the battery. This solution is particularly advantageous when the system has to calculate the altitude of mobile elements implemented.

Power can also be supplied indirectly by remote supply. According to this embodiment, a layer of dedicated radiating solenoids is placed under the detection surface. A sine wave signal passes through these solenoids and the power emitted by each solenoid is sufficient for a remote power supply to the localisation modules positioned above it. The localisation modules are also equipped with a solenoid for reception, by induction, of the signal emitted by the solenoids present beneath the detection surface.

The remote power supply can also be coupled with the use of a high-capacity capacitor, which is charged from the solenoid of the localisation module. The capacitor is then used as a voltage source to supply power to the other modules. Alternatively, the remote power supply can be coupled with the use of a battery present in the mobile element, for example a lithium battery. The solenoid of the localisation module then constantly recharges this battery as soon as an induced current passes through it. A charge/discharge protection circuit is advantageously associated with the battery so that it remains within its range of acceptable voltages. As previously indicated, if the altitude of mobile elements has to be assessed, the voltage source is preferably regulated so that the power supply voltage is constant during use of this voltage source, i.e. during estimation of the position and/or orientation of the mobile element.

The mobile elements located on a detection surface and used together can use different types of power supply.

Furthermore, when a mobile element comprises more than one localisation module, certain components, in particular the electric power supply, can be common to some or all of the localisation modules.

Figure 8:
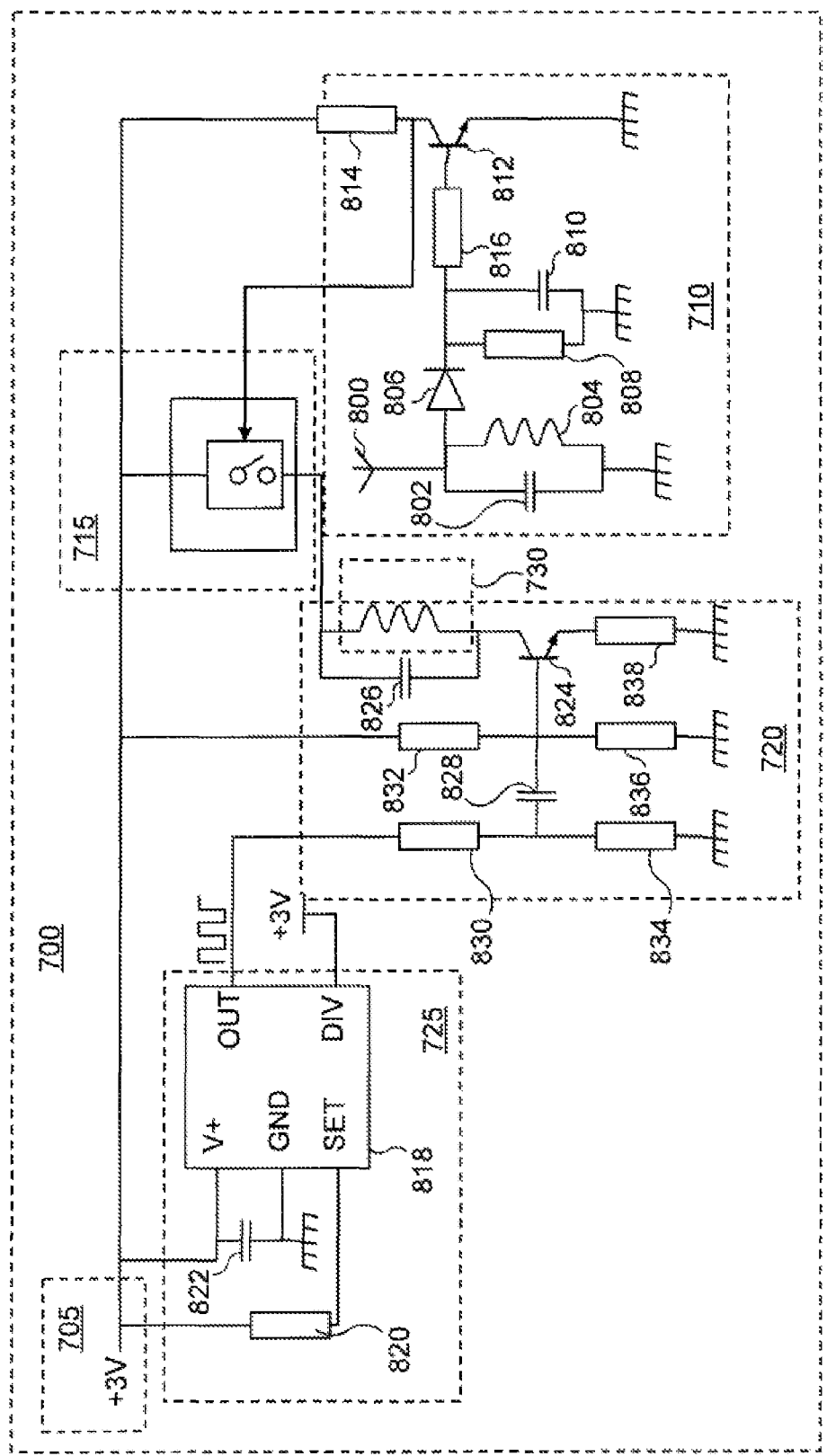
FIG. 8 shows an example of electronic implementation of the logic diagram described with reference to FIG. 7 relating to a localisation module of a mobile element the position and/or orientation of which can be determined.

FIG. 8 shows an example of electronic implementation of the logic unit configuration described with reference to FIG. 7 relating to a localisation module of a mobile element the position and/or orientation of which can be determined The electronic configuration shown in FIG. 8 relates to an analog mode with transmission of N carriers by the control module for position detection and capture, N representing the maximum number of localisation modules the positions of which can be calculated by the system.

The purpose of the command reception and detection module 710 here is to detect the frequency of the carrier associated with the localisation module in question. It comprises, in this example of implementation, a receiving antenna 800 and an LC network, comprising a capacitor 802 and an inductor 804 tuned to the emission frequency of the control module for position detection and capture. It also comprises a diode 806 to suppress the negative component of the signal and a low-pass RC filter comprising a resistor 808 and a capacitor 810 to suppress the carrier. If the carrier is present, a signal is present at the output from the filter, while, if the carrier does not correspond to the localisation module in question, the signal is zero at the output from the filter. The command reception and detection module 710 also comprises a switching transistor 812, controlling the switch 715 via a resistor 814 which makes it possible to activate the selective amplifier 720. The switching transistor 812 is here connected to the RC circuit via a resistor 816.

Such an implementation concerns reception of an amplitude-modulated activation signal. However, other modes such as frequency-modulated reception or phase-modulated reception can be implemented.

The switch used is, for example, a Texas Instruments HC 4066 switch. It can be used to activate or deactivate the selective amplifier almost instantaneously (real time). Activation is achieved when the switch is open, i.e. when the selective amplifier is connected to the power supply.

As described above, the local oscillator 725 generates, preferably, a square signal the frequency of which is compatible with the conductive loops of the detection surface (these loops being sized to receive a specific frequency). Here, it comprises an oscillator 818, for example a Linear Technology Company LTC 1799 oscillator, coupled to a resistor 820, here having a value of 4 kOhms, to define an oscillation frequency of 250 KHz compatible with the frequency detected by the detection surface loops.

The selective amplifier 720 makes it possible to convert the square signal generated by local oscillator 725 into a sinusoidal signal. It also ensures an optimum gain at the frequency of the local oscillator and makes it possible to obtain the required intensity of the sine wave signal passing through the solenoid 730 and therefore the optimum electromagnetic radiation towards the detection surface used.

The selective amplifier is here implemented on the basis of a switching transistor 824, capacitors 826 and 828, and the network of resistors 830 to 838. Capacitor 828 has, for example, a value of 33 µF, while resistor 830 has a value of 2 kOhms, resistors 832, 834, 836, and 838 1 kOhm, and resistor 838 100 kOhms. Thus, the turn-on and cut-off times for the selective amplifier 720 are as short as possible.

The command reception and detection module 710 can be implemented according to variants other than that described above. In particular, apart from the analogue mode with transmission of N carriers by the control module for position detection and capture, it is possible to implement an analog mode using a single carrier containing a wanted signal for the activation of a localisation module. According to this variant, a wanted signal the frequency of which is to be detected to activate or a localisation module or not is available at the output from the low-pass RC filter. This signal can, for example, be filtered in a band-pass filter the resonant frequency of which is tuned to the specific activation frequency of the localisation module in question. The output from this band-pass filter is then transmitted to a switching transistor which activates the analog switch allowing activation of the selective amplifier.

Alternatively, a digital mode with transmission of a single carrier containing a wanted digital signal for the activation of a localisation module can be used. According to this variant, a wanted signal is available at the output from the low-pass RC filter. This signal is typically a square signal containing an item of digital information encoded on several bits allowing activation of a plurality of localisation modules. Each localisation module is equipped with a microcontroller, which decodes this signal and, as a function of the encoded value and a predetermined value, activates the analog switch and thus the selective amplifier.

Other communication protocols such as Wi-Fi, Bluetooth, or ZigBee can be used to transmit an activation command.

The pair formed by a local oscillator and a selective amplifier brings certain advantages. In particular, since the local oscillator is always active, it is not necessary to activate and deactivate it. In addition, the selective amplifier used is the element which operates by switching (it is supplied with power or not according to the position of the analog switch). Such an implementation thus authorizes a very short activation and deactivation time for the selective amplifier and makes it possible to optimize the switching times and thus the overall cycle time (a cycle corresponding to the activation/ deactivation of the set of localisation modules).

However, it is possible to implement simpler variants of oscillators which can replace the local oscillator and selective amplifier pair, typically an assembly known under the name of a Colpitts or Clapp type assembly.

As described above, the localisation modules to be activated can be identified in an analog or digital manner. The analog identification of a localisation module can be performed by sending a dedicated frequency, according to several modes, in particular according to a carrier frequency specific to each localisation module (this frequency identifies the localisation module which is activated). The on-board electronics thus react to the specific carrier corresponding thereto. Alternatively, a single carrier frequency can be used for all the localisation modules. This frequency modulates a wanted signal which is received by each localisation module. It is the value of the modulated frequency of this wanted signal which makes it possible to identify the localisation module to be detected. The activation frequencies for each localisation module are, for example, defined in the factory during assembly and are configured in the control module for position detection and capture by means of the software.

The digital identification of a localisation module is performed by transmitting a code, typically over several bits, in an activation message. This identification mechanism allows for greater flexibility of use since it allows programming (and thus modification) of the identification of each localisation module.

FIG. 9, comprising FIGS. 9a and 9b, shows diagrammatically two examples of mobile elements the position of which can be determined and the position and orientation of which can be determined, respectively.

The mobile element 110 shown in FIG. 9a comprises a single localisation module 700. As shown, the radial axis of the solenoid is advantageously perpendicular to the plane of the detection surface so that the electromagnetic radiation from the solenoid is propagated optimally towards this surface.

The three-dimensional position of the mobile element 110, comprising a single solenoid, can be calculated according to the invention, as described above. In fact, on the basis of the calculated position of the solenoid of the localisation module 700 and knowing the position of this module in the mobile element 110, it is possible to deduce therefrom the position of the mobile element 110, i.e. the position of a reference point of this mobile element. When several mobile elements are present on the detection surface, the position of each mobile element is determined sequentially.

The mobile element 110' shown in FIG. 9b comprises two independent localisation modules 700-1 and 700-2. Again, as shown, the radial axis of the solenoids is advantageously perpendicular to the plane of the detection surface so that the electromagnetic radiation from the solenoid is propagated optimally towards this surface.

Each solenoid 700-1 and 700-2 of the mobile element 110' can be activated independently of the other, in a sequential manner. Thus, it is possible to determine the position of the mobile element 110' by determining the position of each solenoid of the localisation modules 700-1 and 700-2 and knowing their position in the mobile element 110'. Similarly, it is possible to know the orientation of this mobile element on the basis of the relative positions of the solenoids of localisation modules 700-1 and 700-2 and their position in the mobile element 110'. It should be noted here that the use of the coordinates of the solenoids of localisation modules 700-1 and 700-2 in the plane of the detection surface makes it possible to determine the orientation of the mobile element 110' in this plane, while the use of the altitude of the solenoids of localisation modules 700-1 and 700-2 can be used to calculate the pitch of the mobile element 110'.

It is noted here that mobile elements comprising a single solenoid and comprising two solenoids can be used together on a detection surface, provided that the control module for position detection and capture is capable of activating (directly or indirectly) each solenoid independently of the others.

Capture of the orientation of mobile elements can thus be obtained by providing each mobile element with at least two localisation modules (which are not to be aligned along a perpendicular to the detection surface) and defining a rule for identifying these localisation modules.

The roll of a mobile element can be determined by providing the latter with two additional localisation modules (four localisation modules are then used) and supplementing the identification rule for these modules in order to associate identifiers for these four localisation modules with a mobile element.

On the basis of three-dimensional positions for four localisation modules of a mobile element, it is possible to calculate its six degrees of freedom.

It is also possible, by associating three localisation modules with a mobile element, forming an equilateral triangle, to calculate approximately its six degrees of freedom.

The sequential activation of localisation modules, by a control module for position detection and capture, makes it possible to estimate the position and/or orientation of a plurality of mobile elements provided with such localisation modules.

When a localisation module receives an activation command dedicated thereto, it triggers an electromagnetic emission. The detection system, knowing the identification of the emitting localisation module, can then link the items of calculated position information to the identifier of the localisation module.

The control module for position detection and capture is thus responsible here for sequentially activating an electromagnetic emission per localisation module, for recovering one by one a set of positions and, knowing the links between the identifiers of the localisation modules and identifiers of mobile elements, for calculating orientations, if necessary, in order to associate positions and/or orientations with the identifiers of mobile elements. It thus constructs a table containing, for each mobile element, an identifier, an abscissa, an ordinate and, preferably, an altitude in a detection surface reference as well as, if necessary, values for yaw, pitch and roll.

The sequential activation of the electromagnetic emission from the detection modules permits the use of a single emission frequency for the set of moving elements managed by the system. Different activation algorithms can be used by the control module for position detection and capture. It is thus possible to activate all the localisation modules systematically, to activate a subset of localisation modules, this subset being, for example, defined by programming via the calculation module (such an implementation makes it possible in particular to reduce the overall duration of the complete activation sequence for the pieces), or activate localisation modules, depending on the context. The latter solution makes it possible, in particular, to manage the fact that certain mobile elements can leave the detection surface and that their positions and/or orientation no longer need to be calculated. However, a secondary loop preferably monitors their possible reinstatement on the detection surface and the resulting need to capture their position and/or orientation again. This mode makes it possible to optimize the overall duration of the activation sequence for the set of modules to be activated.

FIG. 10 shows a first example of an algorithm which can be used to activate a set of localisation modules sequentially and calculate the positions and/or orientations of the corresponding mobile elements.

A first step consists here of initialising a variable i, representing an index on localisation modules, to the value zero (step 1000). In a next step (step 1005), the value of the variable i is compared with the value of a constant M representing the number of localisation modules supported by the system. Typically, the order of magnitude of the constant M is a hundred. If the value of the variable i is greater than or equal to that of the constant M, the variable i is reinitialized (step 1000).

If, on the other hand, the value of the variable i is less than that of the constant M, a test is performed to determine whether the localisation module having the index i is used (step 1010), i.e. whether the localisation module having the index i is valid. The validity of the localisation modules can be stored in a table which can be updated by an application using the interface formed by the mobile elements comprising these localisation modules and the system for locating these modules. As shown by the use of dotted lines, this step is optional.

If the localisation module corresponding to the index i is valid, that module is activated (step 1015). As described above, the activation of the localisation module having the index i consists, for example, of emitting a signal the carrier of which has a frequency characterizing an identifier of this localisation module.

When the localisation module having the index i is activated, it emits an electromagnetic field enabling it to be located by measuring the voltages induced in loops of the detection surface, as indicated above.

The control module for position detection and capture is then able to calculate the position of the activated localisation module (step 1020).

These items of information are stored in order to be used by the calculation module (step 1025). They can in particular be stored in a table of the positions of the localisation modules, on the basis of which the positions and/or orientations of the mobile elements comprising these localisation modules can be estimated.

The variable i is then incremented by one (step 030) and the previous steps are repeated (steps 1005 to 1030) until the positions of all the localisation modules (or valid localisation modules) have been determined.

Similarly, if the localisation module corresponding to the index i is not valid (step 1010), the variable i is incremented by one (step 1030) and the previous steps are repeated (steps 1005-1030) until the positions of all the localisation modules (or valid localisation modules) have been determined.

The position and/or orientation of each mobile element are calculated on the basis of the positions of the localisation modules. This calculation can be performed when the positions of all the valid localisation modules have been calculated or, mobile element by mobile element, when the positions of all the valid localisation modules belonging to the same mobile element have been calculated.

It is noted here that the validity of localisation modules can be linked in particular to the logic unit of the application using the interface formed by the mobile elements comprising these localisation modules and the system for locating these modules. By way of illustration, in the case of a game, invalid localisation modules can correspond to mobile elements representing pieces not in use in the game, for example pieces which have been taken during a game of chess or unused pieces in a given game scenario.

FIG. 11 shows a second example of an algorithm which can be used to activate a set of localisation modules sequentially and calculate the positions and/or orientations of the corresponding mobile elements.

This algorithm makes it possible in particular to manage the fact that certain mobile elements can leave the zone of movement (i.e. here the detection surface) and that the positions and/or orientations of the corresponding mobile elements no longer need to be estimated. However, a secondary software loop monitors their possible reinstatement on the detection surface and the resulting need to estimate their positions and/or orientations again. This algorithm, in comparison with the algorithm described with reference to FIG. 10, makes it possible to reduce the overall duration of the activation sequence for the set of localisation modules by dynamically managing their validity.

In this algorithm, the constant M corresponds to the maximum number of localisation modules supported by the system, the variable index i characterizes the index of a localisation module, the table P corresponds to the table of positions of the localisation modules, table V corresponds to the table of validity of the localisation modules, the variable C is a global variable corresponding to the total number of localisation modules used, K is a predetermined constant corresponding to the maximum number of iterations of search for localisation modules outside the detection surface (a typical value for K is of the order of around ten), and A is a variable representing a countdown index of iterations of search for localisation modules outside the detection surface for a global cycle.

The purpose of a first step is to initialize the variables i and C at zero (step 1100). In a next step, the value of the variable i is compared with that of the constant M (step 1102). If the value of the variable i is less than that of the constant M, the table of validity of the localisation modules is updated so that the localisation module corresponding to the index i is considered valid (step 1104). The variable i is then incremented by one (step 1106) and the new value of the variable i is compared with that of the constant M (step 1102). Steps 1102 to 1106 are used to initialize the table of validity of the localisation modules.

If, on the other hand, the value of the variable i is greater than or equal to that of the constant M, the variable i is reinitialized at zero (step 1108). In a next step, the value of the variable i is again compared with that of the constant M (step 1110). If the value of the variable i is less than that of the constant M, a test is performed to determine whether the localisation module corresponding to the index i is valid (step 1112).

If the localisation module corresponding to the index i is valid, that module is activated (step 1114) so that it emits an electromagnetic field enabling it to be located by measuring the voltages induced in loops of the detection surface.

The control module for position detection and capture is then able to calculate the position and, if necessary, the orientation of the activated localisation module (step 1116).

A test is then performed on the coordinates obtained for the localisation module (step 1118). If these coordinates are zero, the validity table for the localisation modules is updated so that the localisation module corresponding to the index i is considered invalid (step 1120). Otherwise, if these coordinates are non-zero, these coordinates are stored in order to be used by the calculation module (step 1122). They can, in particular, be stored in the table of localisation module positions, on the basis of which the positions and/or orientations of the mobile elements comprising these localisation modules can be estimated, as described above.

The variable i is then incremented by one (step 1124) and its value is again compared with that of the constant M (step 1110).

Similarly, if the localisation module corresponding to the index i is not valid (step 1112), the variable i is incremented by one (step 1124) and its value is again compared with that of the constant M (step 1110).

If the value of the variable i is greater than or equal to that of the constant M (step 1110), the value of variable A is initialized at a value of zero (step 1126). A test is then performed to compare the value of the variable A with that of the constant K (step 1128). If the value of the constant K is less than or equal to that of the variable A, the value of the variable i is reinitialized at zero (step 1108) and the steps described above are repeated.

Otherwise, a test is performed to determine whether the localisation module corresponding to an index the value of which is equal to C is invalid (step 1130).

If so, this module is activated (step 1132) so that it emits an electromagnetic field making it possible for it to be located, for example by measuring the voltages induced in the detection surface loops.

The control module for position detection and capture is then able to calculate the position of the activated localisation module (step 1134).

A test is then performed on the coordinates obtained for the localisation module (step 1136). If these coordinates are zero, the validity table for the localisation modules is updated so that the localisation module corresponding to the index the value of which is equal to that of the variable C is considered invalid (step 1138). Otherwise, the validity table for the localisation modules is updated such that the localisation module corresponding to the index the value of which is equal to that of the variable C is considered valid (step 1140).

The values of variables A and C are then incremented by one (step 1142). Similarly, if the localisation module corresponding to an index the value of which is equal to that of the variable C is not invalid (step 1130), the values of variables A and C are then incremented by one (step 1142).

A test is then performed to compare the value of the variable C with that of the constant M (step 1144). If the value of variable C is less than that of the constant M, the values of the variable A and the constant K are compared (step 1128) and the steps described above are repeated.

If the value of the variable C is greater than or equal to that of the constant M, the value of variable C is reinitialized at the value zero (step 1146). The values of variable A and constant K are then compared (step 1128) and the steps described above are repeated.

According to a third example of an algorithm which can be used to sequentially activate a set of localisation modules and calculate the positions and/or orientations of the corresponding mobile elements, the activation of all the localisation modules is initiated by a central processing system (control module for position detection and capture) with a common activation signal, each localisation module independently determining its activation as a function of the common activation signal. The time delay values associated with each localisation module, i.e. here the delay between the detection of the common activation signal (or one of its characteristics called activation "instruction" in the rest of the description) and the activation of the localisation module, can be defined statically, for example by using an identifier stored in the localisation modules as a calculation key, or dynamically.

FIG. 12 shows an example of a timing chart of activation of localisation modules as a function of a common activation signal.

As shown, a common activation signal, denoted sync, comprises here periodic pulses, of period P1 and duration P2. The purpose of each pulse of the sync signal, representing an activation "instruction", is the sequential activation of the localisation modules (all or those previously selected). P2 corresponds to the minimum duration guaranteeing the detection of the common signal by all the localisation modules concerned.

Upon receipt of an activation "instruction" of the sync signal, each localisation module calculates or determines the time delay value at the end of which it has to be activated, i.e., typically the instant at which the switch 715 commands the selective amplifier 720 to generate a sine wave voltage at the terminals of the solenoid 730, allowing the latter to generate a sufficient radiation power. The switch 715 is, for example, according to this example, a microcontroller or a circuit comprising two monostable trigger circuits (one being used as a counter and the other as a switch).

The activation of each localisation module i is shown in FIG. 12, by an Activ. Mi signal. Thus, for example, the localisation module 0 is activated between instants t1+P2 and t1+P2+P3, P3 corresponding here to the duration of activation of each localisation module (P3 is here defined as P1=P2+n×P3, where n represents the number of localisation modules to be activated during a period P1), as shown by the Activ. M0 signal. Similarly, the localisation module 1 is activated between times T1+P2+P3 and t1+P2+2×P3, as represented by the Activ. M1 signal. More generally, the localisation module i is activated between instants t+P2+i×P3 and t+P2+(i+1)×P3 where t represents the instant of reception of an activation "instruction" from a common activation signal.

FIG. 13, comprising FIGS. 13a and 13b, shows the third example of an algorithm which can be used to sequentially activate a set of localisation modules by means of a common activation signal. FIG. 13a shows certain steps implemented in the central processing system while FIG. 13b shows certain steps implemented in each localisation module.

As shown in FIG. 13a, a first step (step 1300) consists here of obtaining a value representing the present instant, for example using the GetTime( ) function, this value being stored in a time variable. The common activation signal sync, or more precisely an activation "instruction", is then emitted during the time interval P2 (step 1305) and the variable i, representing a localisation module index, is initialized at zero (step 1310).

In a next step, the position (in two or in three dimensions) of an activated localisation module is obtained (step 1315). This position can in particular be obtained as described above using a central processing unit (255, 255', or 255"). The position obtained is associated with the localisation module i (step 1320) and the value of the variable i is incremented by one (step 1325).

A test is then performed to determine whether the value of the variable i is less than the number n of localisation modules the positions of which are estimated during a period P1. If not, i.e. after having obtained the position of each localisation module the positions of which are estimated during a period P1, the algorithm returns to step 1300 to begin a new cycle of obtaining positions.

If, on the other hand, the value of the variable i is less than the number n of localisation modules the positions of which are estimated during a period P1, the current instant is compared with the previously stored instant (time) to which are added period P2 and, as necessary, period P3 multiplied by the value of the index i or time+P2+P3+i×P3 (step 1335).

If the value representing the current instant is less than the value time+P2+P3+i×P3, the algorithm loops back to step 1335 (as the localisation module the position of which has been obtained is still activated, the position of another localisation module cannot be obtained). If, on the other hand, the value representing the current instant is not less than the value time+P2+i×P3, the algorithm returns to step 1315 to obtain the position of the localisation module having index i (the value of which had previously been incremented).

In parallel with the steps described with reference to FIG. 13a, each localisation module the position of which has to be obtained executes steps such as those shown in FIG. 13b.

After receiving an activation "instruction" (step 1340), typically a pulse of the sync signal, a time delay value P(i), where i represents a localisation module index (different for each localisation module and comprised between zero and the number of localisation modules minus one), is calculated (step 1345) according to the following expression:

$$P(i) = P2 + i \times P3$$

P(i) thus represents a duration between the start of the activation "instruction" of the common activation signal and the start of activation of the localisation module having the index i.

A value representing the current instant is then obtained, for example using the GetTime( ) function, and assigned to the variables t and timer (step 1350).

Next, the value of the timer variable is subtracted from that of the variable t and the result is compared with the time delay value P(i) previously calculated (step 1355).

If the difference between the variables t and timer is not less than the time delay value P(i), a value representing the current instant is obtained again and assigned to the variable t (step 1360) and the algorithm returns to step 1355. On the other hand, if the difference between the variables t and timer is less than the time delay value P(i), the localisation module having the index i is activated during a time interval P3 (step 1365) such that its position can be obtained.

While the order of activation of the localisation modules can be predetermined and correspond to indices thereof (or a similar item of data), it is also possible to use a dynamic system of activation of the localisation modules as described below with reference to FIG. 14. Such a system can, in particular, be based on a time-division multiple access algorithm (the technique of time-division multiple access is, in particular, operated by second-generation mobile telephone networks such as Global System for Mobile communications (GSM) and variants according to which the number of timeslots can be dynamically reserved exist in standards such as the Bluetooth standard, Bluetooth is a trademark).

Such an embodiment has the advantage of not requiring predefined positions in the sequence of activation of localisation modules. Moreover, such dynamic management makes it possible to resolve conflicts between localisation modules which have identical calculated or predefined time delay values.

According to a particular embodiment, the duration between two activation "instructions" of the common activation signal is divided into a number n+1 of timeslots, of a fixed and predetermined duration, referenced TS0 to TSn. A common activation cycle thus contains n+1 timeslots.

The first timeslot TS0 begins at the moment of emission of an activation "instruction" of the common activation signal. It is specific and reserved for the arrival of new localisation modules.

For the duration of timeslot TS0, the localisation modules not yet having a timeslot assigned emit via their solenoid. If the central processing system receives signals from the localisation modules during the period of timeslot TS0, the central processing system emits a secondary activation signal at the end of each unassigned timeslot. This secondary activation signal can, for example, be a specific tone modulating an FM signal. The localisation modules are then informed of all of the free timeslots.

Each localisation module performs a random selection to determine a free timeslot during which it will emit during the next cycle.

At each cycle and for each free timeslot, there are the following three possibilities:
- the timeslot remains free: no localisation module has selected it. The central processing system therefore continues to indicate that the timeslot is free by emitting a secondary activation signal at the end of the timeslot;
- the timeslot has been selected by a single localisation module, which emits during the period of the timeslot: the central processing system then ceases to emit a secondary activation signal at the end of this timeslot. The disappearance of the secondary activation signal informs the localisation module that its timeslot assignment is in effect, and
- the timeslot has been selected by several localisation modules, which emit during the period of the timeslot: the central processing system detects a collision of signals and continues to indicate that the timeslot is free by emitting a secondary activation signal at the end of the timeslot.

Cases of collisions are resolved for example by algorithms such as those mentioned in the section entitled "Collision backoff and retransmission" in the IEEE 802.3 Ethernet standard.

The release of timeslots is managed by the detection of the absence of emission by a localisation module. A time delay is then triggered. If, during the whole of the time delay, the central processing system does not receive an emission from a localisation module, the corresponding timeslot is considered released.

The timing chart in FIG. 14 shows activation cycles of 25 ms for which the central processing system emits an activation "instruction" (in a common activation signal) at the beginning of each cycle, each cycle being divided into five timeslots referenced TS0 to TS4.

The crosses on the timing chart indicate collisions during allocalisations of timeslots to the localisation modules.

Hypothetically, during the first cycle of the timing chart, timeslot TS1 is here already allocated to a localisation module which is emitting.

Steps E1 to E6 of the timing chart show the allocalisation of timeslots to localisation modules which appear on the detection surface in question:
- step E1: new localisation modules (with no allocated timeslot) emit by default on timeslot TS0. In response, the central processing system emits secondary activation signals at the end of the free timeslots (here timeslots TS2, TS3 and TS4). The new localisation modules perform random selections to assign timeslots on the basis of the free timeslots. Two of them select timeslot TS2, a third selects timeslot TS3;
- step E2: there is a conflict on timeslot TS2. The central processing system signals this by maintaining emission of the secondary activation signal at the end of the timeslot, indicating to the localisation modules awaiting assignment that timeslot TS2 is still free. The localisation modules perform a new random selection;
- step E2a: there is no conflict on timeslot TS3, the assignment request is accepted. The central processing system signals this by interrupting the emission of the secondary activation signal at the end of timeslot TS3. This timeslot is now assigned;
- step E3: no localisation module has selected timeslot TS2. The central processing system signals that it is still available by emitting a secondary activation signal at the end of timeslot TS2;
- step E4: there is a collision on timeslot TS4. The secondary activation signal is maintained at the end of this timeslot to indicate that it is not yet assigned;
- step E5: two unassigned localisation modules have selected timeslots TS2 and TS4. There is no conflict and the assignments are accepted. The central processing system stops emitting secondary activation signals at the end of these timeslots to indicate they are allocated, and,
- step E6: steady mode, each localisation module has been allocated a timeslot.

Although, in the example described here, the final number of localisation modules is equal to the number of timeslots per activation cycle, the activation mechanisms do not impose such a constraint.

The common activation signal can be detected in each localisation module by a high-frequency receiver which demodulates the common activation signal and transmits it to a microcontroller responsible for calculating the time delay associated with the localisation module. When the time delay has elapsed, the localisation module emits a localisation signal by means of its solenoid by producing, for example, a square signal for a period P3 at the resonant frequency of the selective amplifier connected to the solenoid.

Alternatively, the detection, in the high-frequency receiver of a localisation module, of a switch of the common activation signal to a particular state, for example a high state, can trigger a first monostable trigger circuit configured to produce a pulse after a time delay period P(i) allocated to the localisation module. When the time delay has elapsed, the falling edge of the first monostable trigger circuit initiates a second monostable trigger circuit which links the local oscillator to the selective amplifier connected to the solenoid for a period P3. In this embodiment, the monostable trigger circuits can be implemented using binary counters or circuits using the charging time of an RC circuit. The local oscillator can be used as a clock signal of the binary counters.

The common activation signal can be a specific signal or an existing signal. Thus, for example, it is possible to use the signal induced by the synchronization frame of a screen used as a common activation signal, making it possible to omit the high-frequency receiver in the mobile element. In this case, the high-frequency receiver is replaced here by an induction loop tuned to the refresh rate of the screen. This induction loop constitutes a resonant RLC assembly on the frequency specific to the screen and connected to the input of the analog/digital converter of the microcontroller responsible for calculating the time delay associated with the localisation module.

Similarly, the high-frequency receiver can be replaced by an induction loop tuned to the frequency of the remote power supply for the localisation modules (emission of the frequency of the remote power supply being interrupted cyclically in order to provide the common activation signal).

It should be noted here that the common activation signal, as a remote power supply signal of the localisation modules, can be used to transfer data to localisation modules, for example by using frequency modulation encoding.

Similarly, the localisation signals emitted by the localisation modules can be used by the localisation modules to address data, for example an identifier of the localisation module in question and/or the status of a switch, to the central processing system.

According to a particular embodiment, a microcontroller of a mobile localisation module generates a square signal of variable frequency. This frequency modulation makes it possible to encode a bit stream corresponding to the data to be transferred, a frequency F1 corresponding to a low state and a frequency F2 corresponding to a high state. The frequencies F1 and F2 are preferably close to the frequency of the selective amplifier of the localisation module such that the selective amplifier gain is high.

Still according to a particular embodiment, since the localisation modules only emit during timeslots assigned to them, the central processing system is able to identify from which localisation module the received data originate.

According to another particular embodiment, the local oscillator located in the mobile element generates a variable frequency signal. This frequency modulation is implemented, for example, by means of an external polarisation induced by a change in impedance at the input of the local oscillator. Again, this frequency modulation makes it possible to encode the bit stream corresponding to the data to be transferred. The modulated signal received by the central processing system can be processed by an analog input of this system in order to be converted and stored.

Alternatively, the signal received by the central processing system is demodulated by an analog demodulation circuit in order to reconstruct the baseband signal. According to another alternative, the received signal is amplified and sent to a clock input of an internal counter while a second internal counter acts as an internal time reference. This second counter is triggered upon reception of the rising edge of the amplified signal and then is stopped when the first counter reaches a predefined value. The value obtained when the second counter stops is used to discriminate the frequencies of the modulated signal. The higher the value to be reached by the first counter and the higher the clock frequency of the second counter in relation to the frequencies of the modulated signal, the more the frequencies of the modulated signal can be discriminated. Generally, the rate will be $\log_2$ (number of frequencies discriminated) per activation cycle.

Data transfers to or from localisation modules can be encrypted in a standard manner, for example public and private keys of the RSA type.

The duration of activation of a localisation module can also be characteristic of an item of data to be transmitted by the latter, in particular its identity.

It is noted here that the use of a switch in the localisation modules to supply the radiating elements (solenoids or similar) used to determine their position makes it possible to locate these modules in real time and, consequently, to allow a large number of localisation modules to be managed. In fact, as shown in FIGS. 7 and 8, the excitation signal of the solenoid in the localisation modules is always available, this signal being transmitted to the solenoid or not depending on the position of the switch 715 (which can, in particular, incorporate a microcontroller or monostable trigger circuits) and the switching time being negligible here.

By way of illustration, assuming that the cycle for obtaining positions of localisation modules is 50 Hz and that 50 localisation modules are used, the activation time of each localisation module is about 0.4 ms. If the turn-on and stop time is of the order of 1% of the activation duration, this must be of the order of 40 μs.

According to a particular embodiment, the emission frequency of the solenoid of the localisation modules is set within a range close to 100 kHz. At this frequency, the electromagnetic coupling between the localisation module and the detection surface loops is mainly of a magnetic order.

This choice of frequency makes it possible to limit the interference induced by a screen (positioned between the detection surface and the localisation modules) on the electromagnetic coupling between the localisation modules and the detection surface (the radiation from a screen is mainly electrical in nature). It is therefore possible to place the detection surface and the localisation modules to either side of the screen while maintaining optimum operation of the system.

It is recalled that the strength of the magnetic field generated by a solenoid is given by the following formula:

$$B = c \cdot I \cdot \frac{N}{L}$$

wherein c is a constant, I is the intensity of the current passing through the solenoid, N is the number of turns of the solenoid, and L is the length of the solenoid.

Since the dimensions of the solenoid are constrained so that the dimensions of the localisation module are reduced and allow for incorporation into usual objects and L is typically of the order of a few millimetres, N is then sized to obtain a sufficient magnetic field strength.

Furthermore, in order to allow for correct coupling across the surface of a screen, the value of the current passing through the solenoid has to be optimized. It is this which provides for the implementation of the local oscillator coupled to the radiating selective amplifier. The local oscillator generates the exact resonant frequency of the radiating selective amplifier. When activated, the radiating selective amplifier operates at its exact resonant frequency and ensures that the current passing through the solenoid is at a maximum.

Depending on the intended application, it may be necessary to limit the operation of the system to a subset of available localisation modules or to associate a particular function with certain localisation modules. Thus, in an initialisation phase of the system, it may be necessary to define a list of localisation modules the position of which need not be calculated (their electromagnetic emission is not activated by the activation module). This list can vary over time and can differ from its initial value defined during the initialisation phase. It is also possible, in an initialisation phase, to assign a specific function or role to a localisation module or a mobile element. Thus, for example, a mobile element associated with a predefined localisation module can play the role of a King if this mobile element is being used in a chess program, the same mobile element also being able to play the role of an eraser or felt-tip pen in a drawing application or even have the role of a car in a driver training program.

By way of example, the association between localisation modules and a function can be made by arranging the mobile elements comprising these localisation modules on specific parts of the detection surface and triggering a recording. The control module for position detection and capture then performs a complete activation sequence and the roles are associated according to the respective positions of the mobile elements (e.g. pieces in a team A versus pieces in a team B).

When a screen is superimposed on the detection surface, it is possible to choose a role in a contextual menu for each mobile element by displaying a menu near the position of each mobile element, offering different possible roles.

A particular application of the invention relates to board games while making it possible to keep the convivial aspect of board games and the pleasure of handling real pieces or figures and benefiting from the interactivity and dynamism of video games. In this field of application, a large touch screen is preferably superimposed on the surface for the detection of the pieces.

The localisation modules are advantageously placed in the bases of the figures used in the game, thus ensuring detection of the position of the figures in the game.

The touch screen can display the game playing area on which the figures will move, thus providing dynamic visual support. Typically, the screen displays an animated and realistic environment for the figures (corridors in a spaceship for a science fiction game, geographical zones for a game of the "Risk" type, a chessboard if the figures are chess pieces, etc.).

When launching the game, the system offers to assign a function to the mobile elements in order to enable the program to make a relationship between the identifier of one or more detection modules and the figure represented by this mobile element. This can be done by displaying a specific menu for selecting roles on the screen near the position of each figure placed on the board.

When pieces have been recorded, i.e. their roles have been assigned to them, they become genuine interfaces in the game. The system can then continuously verify that the movements of the figures properly respect the limitations on movement imposed by the rules of the game, taking into account their role in the game (moving from square to square in a corridor for example, respecting the appropriate movements for a game of chess, etc.). The system can also calculate and display on the screen the lines of sight between two figures in a combat game or automatically calculate and display possible captures in chess. It is also possible to trigger contextual visual animations under a figure or from a figure. Thus, selecting a weapon shot on the menu for a figure can produce specific lighting around the shooter and display tracer shots between two figures. Similarly, it is possible to trigger contextual audio animations when the relative position of two figures permits. For example, if, when moving a figure, the system determines the existence of a line of sight with another figure, an audio "target in sight" alarm can be triggered by the system.

Similarly, it is possible to display contextual menus depending on the position of the figures (a menu to calculate the result of hand-to-hand combat is displayed if two enemy figures are at a minimum distance apart), offer automatic online help when a player makes a forbidden movement with his figure, and change the display on the screen when players perform turns with the figures.

In addition, specific characteristics (colour, eraser or line thickness function for a mobile element representing a pencil) can be associated with the different mobile elements. They can be transmitted by the localisation modules (directly or as a function of associated time delay values), as described above. The selection of a function or colour can be displayed on the object comprising the localisation module in question by dedicated Light-Emitting Diode (LED) display, for example.

For the same mobile element, it is also possible to change its characteristics by modifying one of these parameters upon user action (a ring, a thumbwheel, or a switch on the pen for example). On the basis of these mechanical interventions, a microcontroller present in the localisation module can modify the associated time delay value or transmit data, in particular in the form of a bit stream, indicating that a new function has been selected.

Other particular applications of the invention relate to the control of independent objects such as cars, boats, helicopters, and aeroplanes. Thus, for example, for a motor race, the invention can provide driving assistance for a car controlled by a player and control other vehicles driven by the system. If the vehicles are equipped with two localisation modules, it is possible to smooth the calculated trajectories.

Similarly, for a helicopter piloting application, the invention can provide help in piloting, in particular during takeoff and landing phases, while benefiting from simplification of the on-board electronics in the helicopter (the gyroscope usually used becomes unnecessary for example). If the airborne mobile object has three localisation modules, control can be achieved in three dimensions, since the central processing system has six degrees of freedom in real time (x-axis, y-axis, altitude, pitch, roll and heading).

Naturally, in order to provide for specific requirements, a person skilled in the field of the invention can apply modifications to the above description.

The invention claimed is:

1. Method for interfacing in real time a plurality of mobile elements (110, 110') with a computer system, the method being characterized in that it comprises the following steps, transmission (1015, 1114, 1305) of an activation signal to at least one localisation module (700, 700-1, 700-2) incorporated in at least one mobile element of said plurality of mobile elements;

sequential activation of said at least one localisation module, said activation comprising a switching step to excite a radiating element of said at least one localisation module;

reception of at least one signal from said at least one activated localisation module;

calculation (1020, 1116), on the basis of said at least one received signal, of at least one item of information on the position of said mobile element comprising said at least one activated localisation module, a single localisation module being able to be activated at a given instant.

2. Method according to claim 1 wherein said activation signal comprises an item of data making it possible to identify a localisation module in order to selectively activate a single localisation module.

3. Method according to claim 1 wherein said activation signal is a common activation signal for common control of the activation of a plurality of localisation modules.

4. Method according to claim 3 further comprising a step to calculate a time delay value for each localisation module of said plurality of localisation modules, said time delay value representing a time interval between the reception of an activation signal and the activation of the localisation module.

5. Method according to claim 4 wherein each time delay value is determined according to an item of localisation module identification data.

6. Method according to claim 4 wherein each time delay value is dynamically determined.

7. Method according to claim 6 wherein each time delay value is determined according to a time-division multiple access algorithm.

8. Method according to claim 3 wherein said common activation signal is induced by a signal used independently of said method.

9. Method according to claim 1 further comprising a step to calculate at least one item of information on the orientation of said mobile element, said mobile element comprising at least two localisation modules.

10. Method according to claim 1 further comprising a step of transmitting at least one item of data from said at least one localisation module to said computer system.

11. Method according to claim 1 further comprising a step to check the validity (1010, 1112) of said at least one localisation module, said step of sequential activation of said at least one localisation module being performed in response to said validity check step.

12. Method according to claim 11 further comprising a step of assigning (1138, 1140) a state of validity or invalidity to said at least one localisation module, said state of validity or invalidity being determined according to said at least item of position information.

13. Method according to claim 1 wherein said step of reception of at least one signal comprises a step of sequential selection of a plurality of receivers, said at least one signal being received by least one receiver selected from said plurality of receivers.

14. Device for interfacing a plurality of mobile elements (110, 110') with a computer system, the device comprising means suitable for the implementation of each of the steps of the method according to claim 1.

15. Mobile element (100, 110') for a device to interface a plurality of mobile elements with a computer system, said mobile element being characterized in that it comprises at least one localisation module (700, 700-1, 700-2), said localisation module comprising the following means, means (730) for emitting a signal for making it possible to calculate the position of said localisation module;

means (720, 725) for generating an excitation signal of said means for emitting a signal;

switching means (715) for controlling the transmission of said excitation signal to said means for emitting a signal; and, means (710) for receiving an activation signal and, according to at least one item of information of said activation signal, activating said switching means to enable the emission of a signal which can be used to calculate the position of said localisation module.

16. Mobile element according to claim 15, said means for receiving an activation signal comprising means for calculating a time delay value, said time delay value representing a time interval between the reception of an activation signal and the activation of said switching means.

17. Mobile element according to claim 16, said at least one localisation module comprising at least one solenoid, excitable by induction, for supplying electric power to components of said at least one localisation module.

18. Mobile element according to claim 15, said at least one localisation module comprising at least one solenoid, excitable by induction, for supplying electric power to components of said at least one localisation module.

* * * * *